US010783400B2

(12) United States Patent
Kriegman et al.

(10) Patent No.: US 10,783,400 B2
(45) Date of Patent: Sep. 22, 2020

(54) GENERATING SEARCHABLE TEXT FOR DOCUMENTS PORTRAYED IN A REPOSITORY OF DIGITAL IMAGES UTILIZING ORIENTATION AND TEXT PREDICTION NEURAL NETWORKS

(71) Applicant: Dropbox, Inc., San Francisco, CA (US)

(72) Inventors: David J. Kriegman, San Francisco, CA (US); Peter N. Belhumeur, New York, NY (US); Bradley Neuberg, San Francisco, CA (US); Leonard Fink, San Francisco, CA (US)

(73) Assignee: DROPBOX, INC., San Francisco, CA (US)

(*) Notice: Subject to any disclaimer, the term of this patent is extended or adjusted under 35 U.S.C. 154(b) by 112 days.

(21) Appl. No.: 16/224,698

(22) Filed: Dec. 18, 2018

(65) Prior Publication Data

US 2019/0311227 A1  Oct. 10, 2019

Related U.S. Application Data

(60) Provisional application No. 62/653,983, filed on Apr. 6, 2018.

(51) Int. Cl.
*G06K 9/62* (2006.01)
*G06K 9/46* (2006.01)

(52) U.S. Cl.
CPC .......... *G06K 9/6256* (2013.01); *G06K 9/46* (2013.01); *G06K 9/6262* (2013.01); *G06K 2209/01* (2013.01)

(58) Field of Classification Search
None
See application file for complete search history.

(56) References Cited

U.S. PATENT DOCUMENTS 5,668,898 A * 9/1997 Tatsuta ............... G06K 9/3283
382/168
5,883,986 A    3/1999 Kopec et al.
(Continued)

FOREIGN PATENT DOCUMENTS

EP           0718808 A2 *  6/1996  ............ G07D 7/004
KR       20190091101 A  *  8/2019
WO        WO-9305480 A1 *  3/1993  ......... G06K 17/0032

OTHER PUBLICATIONS

Yang et al., "Smart library: identifying books on library shelves using supervised deep learning for scene text reading." In 2017 ACM/IEEE Joint Conference on Digital Libraries (JCDL), pp. 1-4. IEEE, Jun. 19, 2017. (Year: 2017).*

(Continued)

*Primary Examiner* — Feng Niu
(74) *Attorney, Agent, or Firm* — Keller Jolley Preece

(57) ABSTRACT

The present disclosure relates to generating computer searchable text from digital images that depict documents utilizing an orientation neural network and/or text prediction neural network. For example, one or more embodiments detect digital images that depict documents, identify the orientation of the depicted documents, and generate computer searchable text from the depicted documents in the detected digital images. In particular, one or more embodiments train an orientation neural network to identify the orientation of a depicted document in a digital image. Additionally, one or more embodiments train a text prediction neural network to analyze a depicted document in a digital image to generate computer searchable text from the depicted document. By utilizing the identified orientation of the depicted document before analyzing the depicted document with a text prediction neural network, the disclosed (Continued)

systems can efficiently and accurately generate computer searchable text for a digital image that depicts a document.

20 Claims, 17 Drawing Sheets

(56) References Cited

U.S. PATENT DOCUMENTS

| | | | |
|---|---|---|---|
| 8,489,583 B2* | 7/2013 | Phillips | G06K 9/00483 |
| | | | 707/723 |
| 8,566,349 B2* | 10/2013 | Ragnet | G06K 9/00879 |
| | | | 707/780 |
| 9,767,353 B2* | 9/2017 | Reese | G06K 9/00463 |
| 9,785,855 B2* | 10/2017 | Gordo Soldevila | G06K 9/66 |
| 2006/0085477 A1 | 4/2006 | Phillips et al. | |
| 2006/0193518 A1 | 8/2006 | Dong | |
| 2009/0046320 A1* | 2/2009 | Dariel | G06F 16/972 |
| | | | 358/1.15 |
| 2011/0078191 A1 | 3/2011 | Ragnet et al. | |
| 2016/0063321 A1 | 3/2016 | Reese et al. | |
| 2017/0177965 A1 | 6/2017 | Soldevila et al. | |
| 2017/0286415 A1* | 10/2017 | Kumar | G06F 16/434 |
| 2018/0024974 A1* | 1/2018 | Welinder | G06T 5/007 |
| | | | 715/229 |
| 2018/0211109 A1* | 7/2018 | Wang | G06K 9/6267 |
| 2019/0220660 A1* | 7/2019 | Cali | G06K 9/00442 |

OTHER PUBLICATIONS

Rashid et al., "A discriminative learning approach for orientation detection of urdu document images." In 2009 IEEE 13th International Multitopic Conference, pp. 1-5. IEEE, 2009. (Year: 2009).*

Bijalwan, Deepak Chandra, and Alok Aggarwal; "Automatic text recognition in natural scene and its translation into user defined language"; InParallel, Distributed and Grid Computing (PDGC), 2014 International Conference on Dec. 11, 2014 (pp. 324-329). IEEE. Date of Publication: Mar. 2005.

Kaur, Davinder, and Mrs Rupinder Kaur Gurm; "Machine Printed Gurumukhi Numerals Recognition using Convolutional Neural Networks." International Research Journal of Engineering and Technology (IRJET); Date of Publication: Mar. 2005.

Pastor Pellicer, J. (2017); Neural Networks for Document Image and Text Processing; . Neural Networks for Document Image and Text Processing [Non-published doctoral thesis]. Universitat Politècnica de València. doi:10.4995/Thesis/10251/90443.

* cited by examiner

GENERATING SEARCHABLE TEXT FOR DOCUMENTS PORTRAYED IN A REPOSITORY OF DIGITAL IMAGES UTILIZING ORIENTATION AND TEXT PREDICTION NEURAL NETWORKS

CROSS REFERENCE TO RELATED APPLICATIONS

This application claims the benefit of U.S. Provisional Application 62/653,983, filed Apr. 6, 2018. The aforementioned application is hereby incorporated by reference in its entirety.

BACKGROUND

Online or "cloud" storage systems have become an increasingly popular avenue for storing and managing electronic media generated via client devices. For example, some conventional online storage systems allow users to capture digital photographs and videos on a smart phone, and then store the captured media items on one or more remote servers for later retrieval and use. Similarly, conventional online storage systems also allow users to save and access electronic document files (e.g., word processor files, spreadsheet files, and/or other electronic files) or other digital data.

In some cases, users choose to store documents by capturing digital photos of the documents (e.g., paper receipts, invoices, pay stubs, bills, reports, and so forth) and storing the digital photos online via one or more remote servers. Although conventional systems allow users to store and access these digital photos, these conventional systems have several shortcomings.

For example, conventional online storage systems are inflexible in managing digital image repositories that include digital photos of documents. To illustrate, conventional online storage systems generally store, search, and access digital photos utilizing rigid meta-data such as a user given title, date of creation, and/or technical specifications. As a result, conventional systems cannot flexibly search and utilize digital photos portraying documents beyond the scope of these rigid categories.

In addition, conventional systems are also inefficient in relation to managing digital images that portray documents. For instance, users frequently utilize conventional online storage systems to search for and utilize text portrayed in documents, but conventional systems lack efficient means for identifying pertinent digital images portraying documents with text. Accordingly, conventional online storage systems waste significant time and computing resources as users inefficiently search through digital images stored on remote servers to identify digital text in the digital images. For example, many conventional systems generate and provide thousands of thumbnails (or other digital image representations) for users to review and search in attempting to identify text portrayed in digital images.

These shortcomings are often exacerbated by inaccuracies of digital images within conventional online storage systems. For example, digital photos of documents in conventional systems are frequently skewed, blurred, shaded, rotated or otherwise distorted. These inaccuracies only increase the difficulty of searching for and utilizing documents portrayed in digital images utilizing conventional systems. For instance, some conventional systems have utilized optical character recognition algorithms for identifying text from scanned documents. Although these optical character recognition algorithms can identify text in relatively sterile scanned documents, they fail to accurately, efficiently, or flexibly generate searchable text from documents portrayed in user-captured digital images such as digital images captured with a smartphone. Imperfections, distortions, rotations, and other digital content (e.g., images of people or places) in digital images generally stored in online digital image repositories undermine the accuracy and efficiency of such conventional systems.

SUMMARY

One or more embodiments of the present disclosure provide benefits and/or solve one or more of the foregoing or other problems in the art with systems, methods, and non-transitory computer readable storage media that generate searchable text for documents portrayed in a repository of digital images utilizing an orientation neural network and/or text prediction neural network. For example, disclosed systems can efficiently and accurately identify a digital image depicting a document within a repository of digital images. Moreover, the disclosed systems can automatically modify the digital image by identifying document boundaries, rectifying the document, and rotating the digital image such that text of the document is properly oriented. Furthermore, the disclosed systems can accurately identify the contents of the documents depicted in the digital image utilizing a text prediction neural network efficiently trained utilizing synthetically generated text training data. The disclosed systems can then utilize the searchable text generated from documents portrayed in the digital images to flexibly search, organize, and manage the digital images.

To illustrate, in at least one embodiment, disclosed systems use a document detection neural network to identify a digital image depicting a document within a repository of digital images. Additionally, disclosed systems can apply an orientation neural network to the identified digital image to detect the orientation of the depicted document within the digital image. Moreover, disclosed systems can crop image portions (e.g., word boxes) from the depicted document within the digital image and utilize a text prediction neural network to generate computer searchable text. In particular, the disclosed systems can utilize the text prediction neural network trained with synthetic training data to generate computer searchable text based on the image portions (e.g., word boxes) from the depicted document and the detected orientation of the document.

Additional features and advantages of the present invention will be set forth in the description that follows, and in part will be obvious from the description, or may be learned by the practice of the various embodiments described. The features and advantages of such embodiments may be realized and obtained by means of the instruments and combinations particularly pointed out in the appended claims. These and other features will become more fully apparent from the following description and appended claims.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
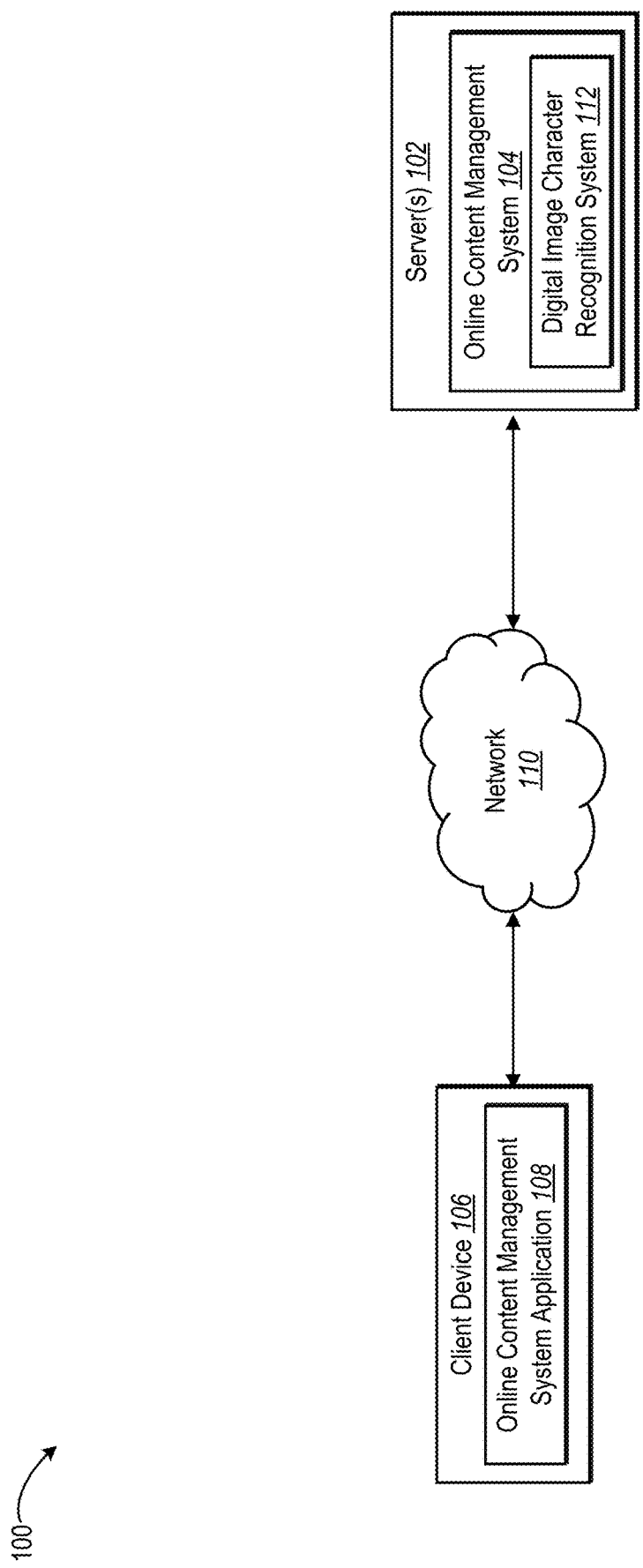
FIG. 1 illustrates a schematic diagram of an environment for implementing the digital image character recognition system in accordance with one or more embodiments.

One or more embodiments of the present disclosure include a digital image character recognition system that identifies documents portrayed in digital images and generates searchable text from the documents utilizing an orientation neural network and/or text prediction neural network. In particular, in one or more embodiments, the digital image character recognition system automatically detects a digital image that depicts a document within a repository of digital images (e.g., utilizing a document detection neural network) and converts the document to searchable text. For instance, upon identifying a digital image that depicts a document, the digital image character recognition system can determine a document boundary, rectify the document, and utilize an orientation neural network to identify (and modify) the orientation of the depicted document. Furthermore, the digital image character recognition system can then generate searchable text from the document utilizing an optical character recognition algorithm that includes a text prediction neural network.

To illustrate, in one or more embodiments, the digital image character recognition system detects a digital image that includes a depiction of a document. The digital image character recognition system then utilizes an orientation neural network to detect an orientation of the document within the digital image. The digital image character recognition system can then crop a word box from the digital image (i.e., a word box from the depiction of the document in the digital image). The digital image character recognition system can then utilize a text prediction neural network trained with synthetic training data to generate computer searchable text for the portion of the depiction of the document based on the word box and the detected orientation of the document.

As just mentioned, in one or more embodiments, the digital image character recognition system utilizes a document detection neural network to identify a digital image depicting a document. In particular, the digital image character recognition system can utilize a deep neural network trained based on training digital images portraying training documents to identify digital images in an image repository that depict documents. In this manner, the digital image character recognition system can classify digital images that do (or do not) portray documents.

Upon identifying digital images that portray documents, the digital image character recognition system can modify the digital images (e.g., to prepare the digital image for transformation into searchable text). For example, in some embodiments, the document detection neural network identifies document boundaries and corners. Utilizing the boundaries and corners, the digital image character recognition system can then crop and rectify the detected depiction of the document. Additionally, the digital image character recognition system can correct visual imperfections in the depiction of the document in the digital image (e.g., colors, shadows, contrast, skews, etc.).

Moreover, as mentioned above, in one or more embodiments the digital image character recognition system utilizes an orientation neural network to identify the orientation of the depicted document and correct the orientation of the document. For instance, the digital image character recognition system can train an orientation neural network based on training digital images at a variety of different orientations. The digital image character recognition system can then utilize the trained orientation neural network to classify orientation of identified documents in digital images (e.g., classify as rotated 0 degrees, 90 degrees, 180 degrees, and/or 270 degrees).

Upon identifying orientation of the document portrayed within the digital image, the digital image character recognition system can apply an optical character recognition algorithm that includes both a word detector and a text prediction neural network to generate searchable text. For example, in some embodiments, the digital image character recognition system utilizes a word detector that identifies depictions of text in the digital image and crops word boxes for the depictions of text. Furthermore, in one or more embodiments, the digital image character recognition system provides the word boxes (and/or the identified orientation) to a text prediction neural network. The text prediction neural network analyzes the word boxes (in light of the identified orientation) and generates computer searchable text for the word boxes.

In one or more embodiments, the digital image character recognition system also trains the text prediction neural network. For instance, the digital image character recognition system can train the text prediction neural network utilizing training text (e.g., training text boxes illustrating distorted words) and ground truth text labels for the training text. Specifically, the digital image character recognition system can train the text prediction neural network by analyzing the training text, predicting a text label, and then comparing the predicted text label with the ground truth text labels.

As mentioned above, the digital image character recognition system can also train the text prediction neural network utilizing synthetic training data. To illustrate, the digital image character recognition system can identify a corpus of words, a set of fonts, and a set of font distortions. The digital image character recognition system can generate synthetic training data by sampling from the corpus of words and applying a font (from the set of fonts) and distortion (from the set of distortions). The digital image character recognition system can then utilize the resulting synthetic training word(s) in training the text prediction neural network.

Upon generating searchable text from documents portrayed in a digital image, the digital image character recognition system can also utilize the searchable text. For example, in some embodiments, the digital image character recognition system indexes searchable text so users can search a repository of digital images based on words that are depicted in individual digital images. Furthermore, in some embodiments, the digital image character recognition system can utilize the generated computer searchable text to generate a digital overlay to the digital image that includes the searchable text. For instance, the digital image character recognition system can generate a digital overlay to provide visual search results on a digital image (e.g., highlight text on a digital image when showing search results). In addition, the digital image character recognition system can utilize a digital overlay so that users can copy and paste directly from documents portrayed in digital images. Moreover, in some embodiments, the digital image character recognition system can also categorize the digital images based on the depicted documents in the digital image and provide the digital images to a user associated with a particular category.

The digital image character recognition system provides several advantages over conventional systems. For example, the digital image character recognition system can flexibly store, search, and access digital photos based on contents of documents portrayed in the digital images. For instance, as just mentioned, the digital image character recognition system can analyze a repository of digital images, generate searchable text based on documents portrayed in the digital images, and then search the repository of digital images based on the searchable text. Similarly, the digital image character recognition system can flexibly organize, classify, and manage digital images based on contents of documents portrayed in the digital images.

Additionally, the digital image character recognition system also improves efficiency. As an initial matter, the digital image character recognition system avoids unnecessary and time-consuming browsing of digital images to identify pertinent content. Moreover, the digital image character recognition system can identify content of documents portrayed in digital images, avoiding exorbitant computer costs associated with generating and providing thumbnail images for a repository of digital images for browsing pertinent content.

Furthermore, the digital image character recognition system implements a variety of processes to reduce burden on computing resources in generating searchable text. For example, by utilizing the orientation neural network to determine the orientation of documents depicted in digital images the digital image character recognition system can reduce processing power required to generate searchable text. Additionally, utilizing the orientation of the document depicted in the digital image, the digital image character recognition system can avoid analyzing word boxes in multiple orientations (e.g., in all four rotations), thus requiring a fraction of the computer processing power. Similarly, the digital image character recognition system can avoid time and computational costs associated with generating training data for one or more neural networks. For instance, as discussed above, the digital image character recognition system can generate synthetic training data that allows the digital image character recognition system to generate a trained neural network without the cost of observing and gathering training samples with corresponding ground truth labels.

Furthermore, the digital image character recognition system is able to accurately analyze and recognize text within digital images that depict documents. For example, by utilizing a document detection neural network, an orientation neural network, and optical character recognition algorithm (that itself utilizes an accurate word detector and text prediction neural network), the digital image character recognition can generate searchable text that accurately reflects documents portrayed in digital images. For instance, the digital image character recognition system can accurately generate searchable text, even with digital images captured from smartphones that often include imperfections, distortions, rotations and extraneous content.

As illustrated by the foregoing discussion, the present disclosure utilizes a variety of terms to described features and benefits of the event document management system. Additional detail is now provided regarding the meaning of these terms. As used herein, the term "digital image" refers to any digital visual representation. In particular, the term "digital image" includes a digital photograph, symbol, or icon. Furthermore, a digital image includes an image or frame from a digital video. For example, the term "digital image" includes digital files with the following file formats: JPEG, TIFF, PNG, BMP, RAW, CR2, NEF, or PDF. Furthermore, as used herein, the term "repository of digital images" refers to a collection of digital images. For example, the term "repository of digital images" includes a collection of digital images stored on a remote server for one or more users.

As used herein the term "depiction of a document" (sometimes referred to as "document," "displayed document," or "portrayed document" herein) refers to a visual representation of a document within a digital image. Moreover, as used herein, the term "document" refers to any depiction, representation, or portrayal of text. In particular, the term "document" refers to a physical object comprising text, such as numbers, letters, or other characters. For example, the term "document" includes paper with text, hand written notes, signs with text, boards with text, posters with text, or a display screen with text. Additionally, a document can include hand written, printed, or computer-generated text.

Furthermore, as used herein, the term "text" refers to any visual depiction, representation, or portrayal of an element of speech or writing. In particular, the term "text" refers to hand written or printed elements of speech. Specifically, the term text includes hand written or printed characters of any language. For example, text includes characters from languages such as, but not limited to, English, Spanish, Mandarin, Hindi, Gujarati, Japanese, Russian, Arabic, and French.

Additionally, as used herein, the term "neural network" refers to a machine learning algorithm that can be tuned (e.g., trained) based on training inputs to estimate an unknown function. In particular, the term "neural network" can include a plurality of interconnected artificial neurons that transmit data to other artificial neurons that generate outputs based on one or more inputs. More specifically, the plurality of interconnected neurons learns to estimate complex elements by utilizing prior estimations and other training data. For example, the term "neural network" can include deep neural networks, convolutional neural networks ("CNN"), fully convolutional neural networks ("FCN"), or recurrent neural networks ("RNN").

The digital image character recognition system can utilize a variety of neural networks, including document detection neural networks, orientation neural networks, and/or text prediction neural networks. Additional detail regarding exemplary architectures of these neural networks is provided below. However, as used herein, the term "orientation neural network" refers to a neural network trained to identify orientation. In particular, an orientation neural network includes a neural network trained to classify (and/or correct) orientation of a document portrayed in a digital image. In addition, as used herein, the term "text prediction neural network" refers to a neural network trained to predict text. In particular, a text prediction neural network includes a neural network trained to identify text from a document portrayed in a digital image (e.g., from a word box cropped from the document). Moreover, "document detection neural network" trained to identify digital images portraying documents. In particular, the document neural network includes a document detection neural network trained to classify digital images that depict documents (from digital images that do not depict documents).

As used herein, the term "orientation" refers to angular alignment of an object. In particular, the term "orientation" refers to the angular alignment of a document (or text within a document) portrayed within a digital image (e.g., alignment relative to horizontal or some other reference orientation). For example, the orientation can include an angle that represents the direction in which a document is positioned relative to a reference orientation.

Moreover, as used herein, the term "ground truth" refers to a known value in relation to a training sample. For example, a "ground truth orientation" refers to a known orientation of a training document for the purposes of training an orientation neural network. Similarly, as used herein, the term "training" is used as a modifier to indicate information utilized to train a neural network. Thus, for instance, a "training document" refers to a document utilized to train a neural network.

As used herein, the term "word box" refers to a visual representation of text portrayed in a digital image. For example, a word box may include a cropped digital image that represents one or more text objects from a document that are detected as a grouping of text (e.g., text characters that do not have spacing between them).

As used herein, the term "synthetic training data" refers to data that is generated for training a neural network. In particular, the term "synthetic training data" includes data that is generated to imitate data that is organically observed or measured in real world situations and, also, includes corresponding ground truth labels for training a neural network. For example, synthetic training data may include synthetic training digital images. As used herein, the term "synthetic training digital image" refers to a digital image that is generated for training a neural network. Moreover, "synthetic training digital image" refers to a digital image generated to imitate images that are organically created in real world situations, and, also include corresponding ground truth labels for training a neural network. For example, a synthetic training digital image can be an image of a word or text that is generated by combining different characteristics such as words from a corpus of words, fonts, and distortions. Furthermore, the synthetic training digital image can include a ground truth label (a "text label") that identifies the text that is portrayed in the digital image of the word, text, or document. Moreover, as used herein, the term "text label" refers to a label, tag, identifier, list, array, set of strings, or other collections of data that represent the computer searchable text that is represented in the digital image of the word, text, or document.

As used herein, the term "computer searchable text" (or "searchable text") refers to digital text that can be indexed and/or searched by a computing device. In particular, the term "computer searchable text" includes text structures such as strings, integers, characters, HTML mark up, and ASCII that can be searched by a computing device.

As used herein, the term "corpus of words" refers to a collection of text. In particular, the term "corpus of words" includes a collection of words from a single language (e.g., from one or more from works of literature, dictionaries, and/or online databases). More specifically, a "corpus of words" can be represented as a data set, list, data table, array, database or other collections of data that represent text. For example, a corpus of words includes a collection of words from the English language from one or more English dictionaries, novels, and/or articles.

As used herein, the term "set of fonts" refers to a collection of fonts. In particular, a set of fonts includes a data set, list, data table, array, database, or other collections of data that represent fonts. Furthermore, as used herein, the term "font" refers to a set of text characters in a specific style. In particular, the term "font" refers to a particular size, weight, and style for characters in text to create text in unique visual forms. For example, font can include computer-based fonts, such as, Times New Roman, Helvetica, Courier, Calibri, and Arial. Furthermore, font can include different machine-printed or handwritten fonts.

As used herein, the term "a set of distortions" refers to a collection of alterations to text. In particular, a set of distortions includes a data set, list, data table, array, database or other collection of data that represent modifications to text. Furthermore, as used herein, the term "distortion" refers to modifications or transformations that affect the visual appearance of a digital image. In particular, a distortion includes a geometric and/or photometric transformation. For example, distortions include, but are not limited to, image blurring, rotations, underlines, noises, applying lens filters, creases, textures, and/or shadows.

As used herein, the term "modified word" refers to a word from a corpus of words that has been altered by applying fonts and/or distortions to the word. In particular, a modified word is a word that has been visually altered to reflect an applied font and/or an applied distortion. For example, a modified word includes a word that has been altered to be represented in Helvetica and also altered to have a shadow effect on the boundary of the word.

As used herein, the term "token" refers to a data element. A token can be an entry in a data set, list, data table, array, database, index or other collections of data. In particular, "token" refers to an entry in an index utilized to search digital images. More specifically, a "token" refers to a data element that represents a word or a set of words in a database utilized to search digital images.

As used herein, the term "document category" refers to a label that represents a particular type of document. For example, document category includes, but is not limited to, receipts, memos, invoices, essays, and forms.

Additional details of various example embodiments of the digital image character recognition system will now be discussed with respect to the figures. FIG. 1 is a schematic diagram illustrating an example embodiment of exemplary system environment ("environment") 100 in which the digital image character recognition system can operate. As illustrated in FIG. 1, environment 100 can include server(s) 102, client device 106, and network 110.

Although, FIG. 1 illustrates a singular client device 106, it will be appreciated that environment 100 can include any number of client devices (few or greater than shown). Similarly, although FIG. 1 illustrates a particular arrangement of server(s) 102, client device 106, and network 110, various additional arrangements are possible.

Server(s) 102, client device 106, and network 110 may be communicatively coupled with each other either directly or indirectly (e.g., through network 110, discussed in greater detail below in relation to FIG. 12). Moreover, server(s) 102 and client device 106 may include any type of computing device (including one or more computing devices as discussed in greater detail below in relation to FIG. 12).

As mentioned above, environment 100 includes server(s) 102. Server(s) 102 can generate, store, receive, and/or transmit any type of data. For example, server(s) 102 may receive data from client device 106 and send data to client device 106. In one or more embodiments, server(s) 102 may comprise a data server. Server(s) 102 can also comprise a communication server or a web-hosting server.

As shown in FIG. 1, server(s) 102 can include online content management system 104. In particular, online content management system 104 provides functionality by which a user (not shown in FIG. 1) can generate, manage, and/or store digital content. For example, a user can generate new digital content using client device 106. Subsequently, a user utilizes client device 106 to send the digital content to online content management system 104 hosted on server(s) 102 via network 110. Online content management system 104 then provides many options that a user may utilize to store the digital content, organize the digital content, and subsequently search for, access, and view the digital content. Additional detail regarding online content management system 104 is provided below (e.g., in relation to FIG. 13 and online content management system 1302).

Additionally, server(s) 102 can include digital image character recognition system 112. In particular, in one or more embodiments, digital image character recognition system 112 uses server(s) 102 to generate computer searchable text for digital content (e.g., a digital image). For example, digital image character recognition system 112 can use server(s) 102 to detect a digital image that depicts a document, enhance the displayed document in the digital image, identify the orientation of the displayed document, and generate computer searchable text for the digital image of the displayed document. Furthermore, server(s) 102 can store the generated computer searchable text for a digital image that depicts a document on server(s) 102. Additionally, client device 106 can access the generated computer searchable text and the digital image corresponding to the generated computer searchable text via network 110.

In one or more embodiments, client device 106 includes computer devices that allow users of the device to access and interact with digital content, such as digital images that depict documents. For example, client device 106 can include a smartphone, tablet, desktop computer, laptop computer, or another electronic device. Client device 106 can include one or more applications (e.g., online content management system application 108) that allows a user (through client device 106) to access and interact with digital content such as digital images that depict documents. For example, online content management system application 108 can include a software application installed on client device 106. Additionally, or alternatively, online content management system application 108 can include a software application hosted on server(s) 102, which may be accessed by client device 106 through another application, such as a web browser. In at least one embodiment, online content management system application 108 also interfaces with a camera associated to client device 106 in order to capture digital images (e.g., digital photographs).

Moreover, digital image character recognition system 112 may be implemented in whole, or in part, by the individual elements of environment 100. Although FIG. 1 illustrates digital image character recognition system 112 implemented with regard to server(s) 102, it will be appreciated that components of digital image character recognition system 112 can be implemented by any of the components of environment 100 (e.g., by the client device 106). The components of digital image character recognition system 112 will be discussed in more detail with regard to FIG. 10 below.

Figure 2A:
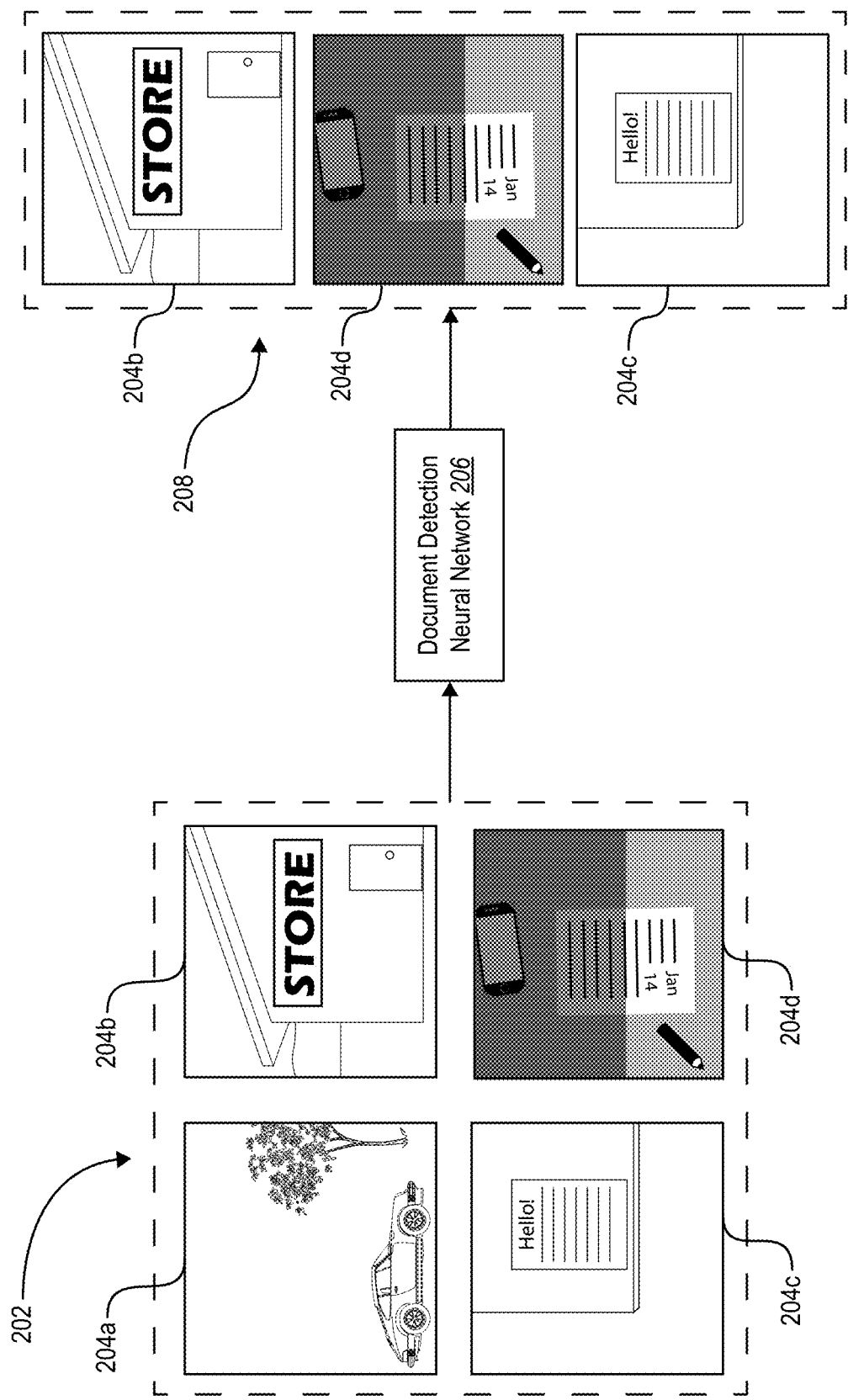
FIG. 2A illustrates an example of a document detection neural network identifying digital images portraying documents in accordance with one or more embodiments.
Figure 2B:
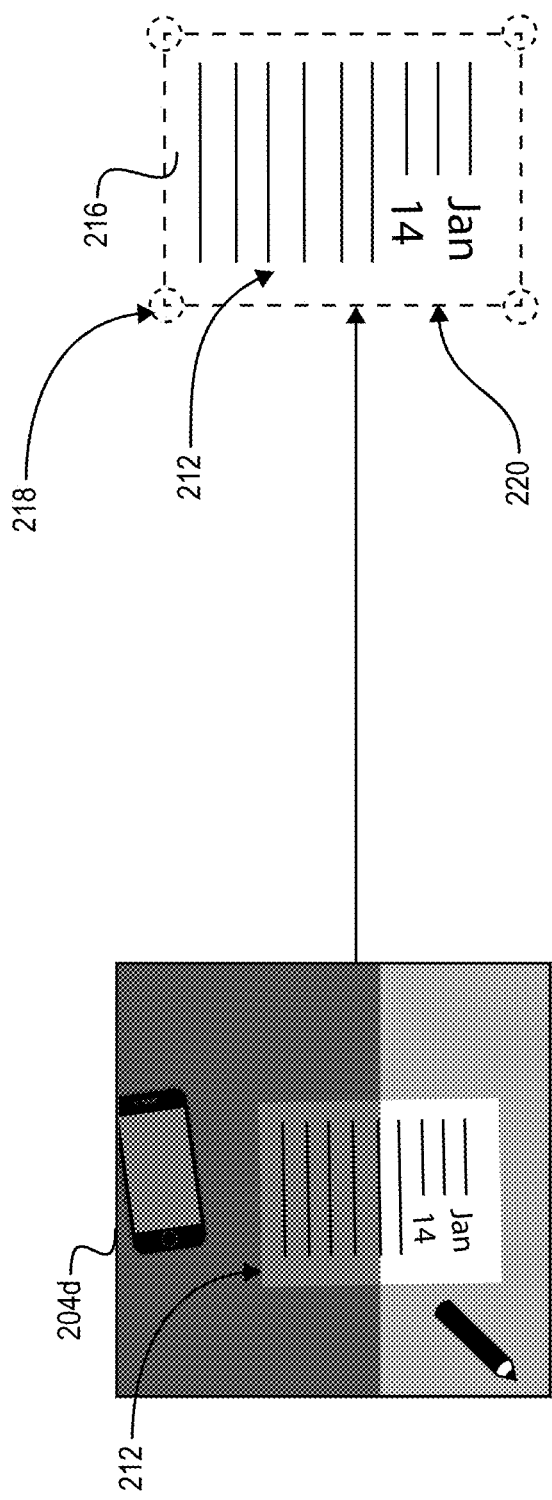
FIG. 2B illustrates identifying and modifying a document depicted within a digital image in accordance with one or more embodiments.
Figure 2C:
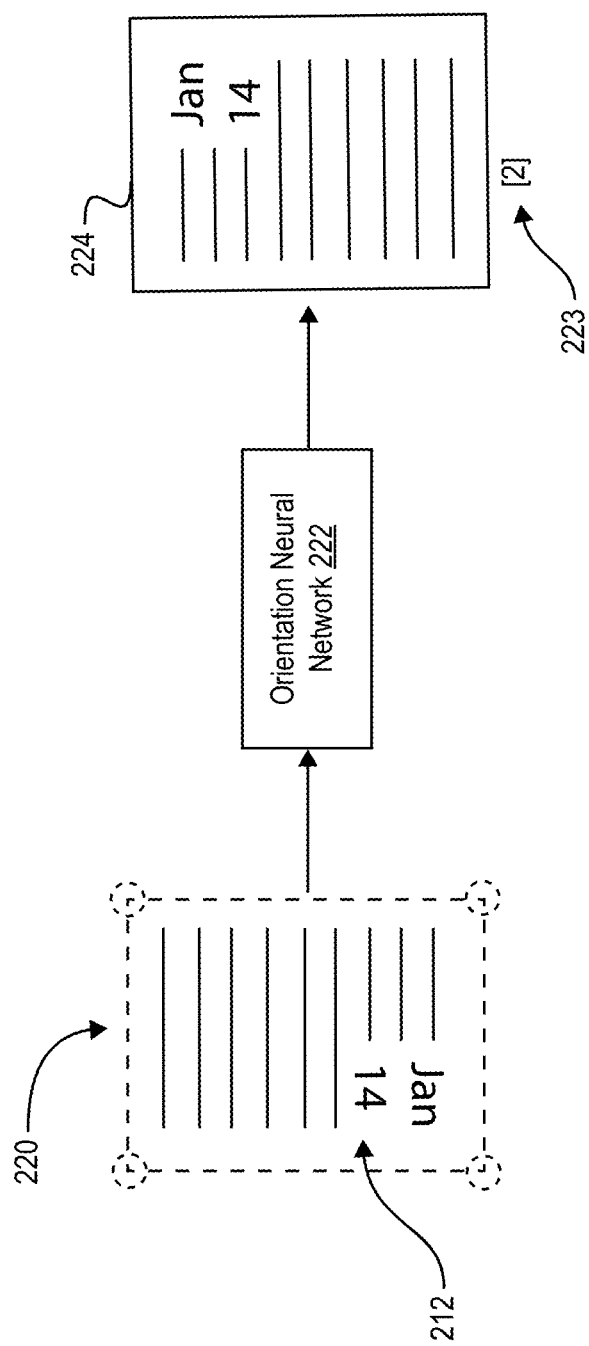
FIG. 2C illustrates identifying orientation of a displayed document in accordance with one or more embodiments.
Figure 2D:
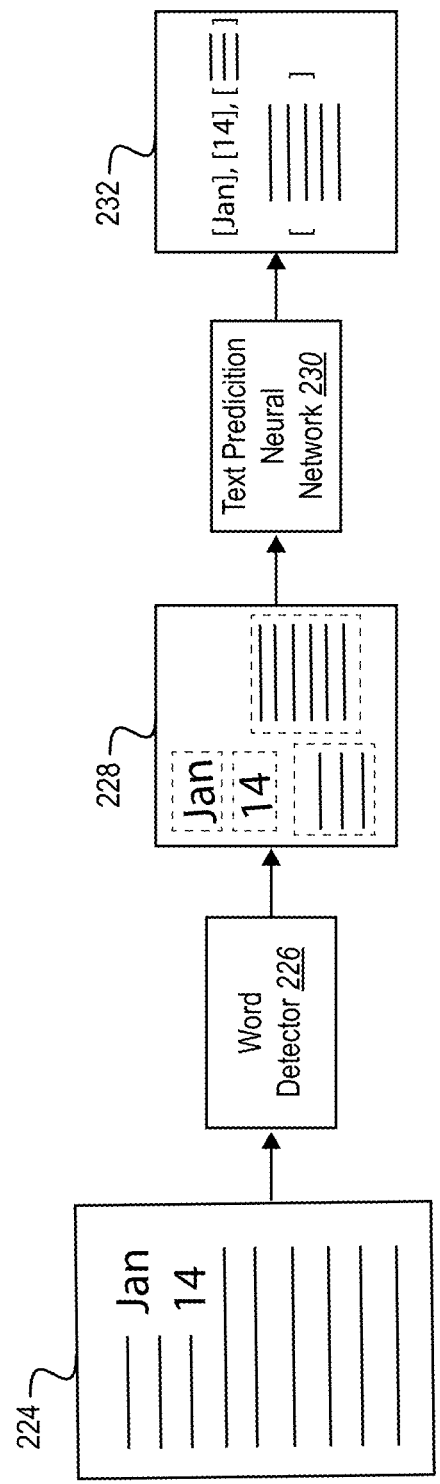
FIG. 2D illustrates detecting words in digital images and generating computer searchable text for the digital image in accordance with one or more embodiments.

As just mentioned, digital image character recognition system 112 can generate computer searchable text for a digital image. For example, FIGS. 2A-2D illustrate digital image character recognition system 112 detecting digital images that depict documents, enhancing the depicted documents, identifying the orientation of the depicted documents, and generating computer searchable text for the digital images that depict documents. In particular, FIG. 2A illustrates digital image character recognition system 112 detecting digital images that depict documents from a repository of digital images (e.g., a repository managed via online content management system 104). Furthermore, FIG. 2B illustrates digital image character recognition system 112 enhancing a depicted document in a digital image. Additionally, FIG. 2C shows digital image character recognition system 112 utilizing an orientation neural network to detect the orientation of a depicted document in the digital image. Moreover, FIG. 2D illustrates digital image character recognition system 112 utilizing a word detector and a text prediction neural network to generate computer searchable text for a depicted document in a digital image.

As shown in FIG. 2A, digital image character recognition system 112 utilizes document detection neural network 206 to detect digital images 204b-d that include a depiction of documents from repository of digital images 202. For instance, in one or more embodiments, digital image character recognition system 112 accesses a repository of digital content to identify digital images 204a-204d (from repository of digital images 202). Furthermore, in some embodiments, digital image character recognition system 112 utilizes document detection neural network 206 on digital images 202 to detect digital images that depict documents ("detected digital images"). Moreover, in one or more embodiments, document detection neural network 206 outputs detected digital images 208.

As shown in FIG. 2A, digital image character recognition system 112 accesses a repository of digital content to identify digital images portraying physical documents. In some embodiments, the repository of digital content is stored on online content management system 104. Digital image character recognition system 112 accesses online content management system 104 to analyze the repository of digital content. In one or more embodiments, digital image character recognition system 112 accesses and analyzes a repository of digital content on a client device (e.g., client device 106).

As shown in FIG. 2A, repository of digital images 202 can include any digital image (e.g., digital images that include depictions of documents and digital images that do not include depictions of documents). For instance, digital image 204a does not include a depiction of a document whereas digital images 204b-204d include a depiction of a digital document (e.g., a building sign in digital image 204b, a document on a table in digital image 204c, and a document accompanied by other items in digital image 204d).

Moreover, as shown in FIG. 2A, after accessing repository of digital images 202, digital image character recognition system 112 utilizes document detection neural network 206 on digital images 204a-d from repository of digital images 202.

For instance, in some embodiments, document detection neural network 206 can determine that digital images 204b, 204c, and 204d all include a displayed document. Thus, document detection neural network 206 outputs a "positive" determination in connection with digital images 204b, 204c, and 204d to indicate that a displayed document is present. Furthermore, document detection neural network 206 can determine that digital image 204a does not include a displayed document and output a "negative" determination in connection with digital image 204a. Moreover, digital image character recognition system 112 can associate metadata with each of the digital images 204a-d, such as a tag or line item, that indicates digital images 204a-d include a displayed document or do not include a displayed document.

In relation to FIG. 2A, digital image character recognition system 112 trains document detection neural network 206 to detect documents within digital images. More specifically, in the embodiment illustrated in FIG. 2A, digital image character recognition system 112 comprises a convolutional neural network image classifier. Digital image character recognition system 112 trains document detection neural network 206 to determine whether a digital image depicts a document by utilizing positive training documents (that portray documents), negative training documents (that do not portray documents), and ground truth classifications (indicating a classification of the training documents). The digital image character recognition system 112 trains document detection neural network 206 by analyzing positive training documents and negative training documents, predicting classifications for the positive training documents and negative training documents, and comparing the predicted classifications with the ground truth classifications. After digital image character recognition system 112 repeatedly trains document detection neural network 206 with positive and negative training images, document detection neural network 206 learns to accurately classify digital images and identify digital images portraying documents. In one or more embodiments, digital image character recognition system 112 trains and utilizes a document classification neural network as described in U.S. patent application Ser. No. 15/658,289 and U.S. patent application Ser. No. 15/658,291, which are incorporated herein by reference.

Furthermore, digital image character recognition system 112 can create a set of document digital images 208. In particular, as just discussed, digital image character recognition system 112 determines, via document detection neural network 206, that digital images 204b, 204c, and 204d depict physical documents. Thus, digital image character recognition system 112 includes digital images 204b, 204c, and 204d in set of document digital images 208. As mentioned above, digital image character recognition system 112 can associate metadata with each of digital images 204b-d to indicate that digital images 204b-d include a displayed document.

As mentioned above, upon identifying digital images portraying documents, digital image character recognition system 112 can generate enhanced digital images. In particular, digital image character recognition system 112 can generate enhanced digital images to prepare the digital images for more accurate and efficient analysis in generating searchable text. For example, in FIG. 2B, digital image character recognition system 112 modifies displayed document 212 in digital image 204d to generate enhanced digital image 216. For instance, digital image character recognition system 112 identifies a boundary and corners of displayed document 212, removes blemishes, adjusts skew, and modifies displayed document 212 in digital image 204d to generate enhanced digital image 216.

For example, as shown in FIG. 2B, digital image character recognition system 112 generates enhanced digital image 216 by identifying the boundaries and corners of displayed document 212 within digital image 204d. Digital image character recognition system 112 can identify a boundary and corners of displayed document 212 in a variety of ways. For instance, in one or more embodiments, digital image character recognition system 112 utilizes computer vision techniques, machine learning, and/or image space conversion to identify displayed document 212 within digital image 204d and determine a boundary and/or corners for displayed document 212.

To illustrate, digital image character recognition system 112 can identify boundaries by performing edge detection, line identification, corner identification, and quadrilateral identification. Furthermore, in one or more embodiments, digital image character recognition system 112 utilizes the Canny edge detection technique to identify all edges of displayed document 212 in digital image 204d. Moreover, in some embodiments, digital image character recognition system 112 utilizes a machine learning-based edge detection technique to detect the boundaries of displayed document 212. For example, one such machine learning-based technique includes a machine learning model based on a Structured Edge Detector algorithm. Moreover, in some embodiments, digital image character recognition system 112 utilizes a Hough Transformation technique to identify lines in a digital image to detect edges (e.g., boundaries).

Furthermore, digital image character recognition system 112 can also utilize a variety of approaches to identify corners of a document within a digital image. For instance, in some embodiments, digital image character recognition system 112 identifies intersections among identified edges or lines in digital image 204d to identify possible corners of displayed document 212.

Also, in some embodiments, digital image character recognition system 112 utilizes geometric constraints to rule out corners that do not correspond to a displayed document boundary. For instance, the geometric constraints can include the measurement of angles between two lines, line length, line length relative to other lines of digital image 204d, ending points of a line, number of total lines of digital image 204d, instances of perpendicular and/or parallel lines with respect to a given line, and other geometric constraints.

Furthermore, digital image character recognition system 112 can indicate the boundary of a displayed document by identifying a quadrilateral from the identified edges and corners of the displayed document. For instance, digital image character recognition system 112 identifies quadrilaterals that represent displayed document 212 and scores the identified quadrilaterals to accurately predict the boundary of displayed document 212. In some embodiments, digital image character recognition system 112 adjusts the identified quadrilateral to ensure that the quadrilateral aligns with the edges of displayed document 212.

In addition to identifying edges and corners of displayed documents to identify a boundary for the displayed document, digital image character recognition system 112 can also modify a digital image of a displayed document. For example, some modifications include cropping, rectifying, altering colors, removing shadows, correcting background and foreground elements in a displayed document, and so forth. For instance, digital image character recognition system 112 utilizes identified boundaries and corners of a displayed document to crop a digital image to remove portions of the digital image outside the boundary of the displayed document. As a result, as shown in FIG. 2B, digital image character recognition system 112 modifies digital image 204d into enhanced digital image 216, where enhanced digital image 216 is cropped in relation to the identified boundaries and corners.

Furthermore, in some embodiments, digital image character recognition system 112 can rectify a displayed document within a digital image to remove or correct skewing or other image warping features. In some embodiments, digital image character recognition system 112 attempts to generate a digital image that represents a displayed document in a square or rectangular shape. For example, in one or more embodiments, digital image character recognition system 112 rectifies displayed document 212 within digital image 204d to remove any skew or warping features in digital image 204d. Furthermore, digital image character recognition system 112 removes warping features to generate a rectangular displayed document in enhanced digital image 216.

Additionally, in some embodiments, digital image character recognition system 112 can rotate enhanced digital image 216. For instance, digital image character recognition system 112 can rotate a digital image to position the edges of the displayed document to a particular alignment. To illustrate, digital image character recognition system 112 can rotate a digital image such that one or more edges of enhanced digital image 216 are vertical or horizontal.

Moreover, digital image character recognition system 112 can modify digital image 204d in order to correct other imperfections such as uneven lighting, shadows, glares, grainy or unclear foreground, or other visual abnormalities that may affect the visual clarity of displayed document 212. In some embodiments, digital image character recognition system 112 converts displayed document 212 to grayscale (e.g., removing any color within the displayed document) and denoises displayed document 212 (e.g., removing background of displayed document 212 of excess variation). Additionally, in some embodiments, digital image character recognition system 112 can subsample displayed document 212 utilizing a Poisson equation to produce a displayed document that includes a crisp foreground and visibility with high contrast, and a background that is nearly uniform white (or uniform gradient).

Furthermore, in one or more embodiments, digital image character recognition system 112 upsamples the displayed document 212 to restore lost resolution. For example, in some embodiments, digital image character recognition system 112 determines whether each pixel in the subsampled version of displayed document 212 is foreground or background. Then, digital image character recognition system 112 creates a tri-map version of displayed document 212 with each pixel of displayed document 212 labeled as "foreground", "background", or "unknown". Moreover, digital image character recognition system 112 assumes pixels are background pixels if they are labeled as background or unknown. Additionally, digital image character recognition system 112 creates contrast between the pixels labeled as foreground pixels and creates a gradient for the background and unknown pixels. As a result, digital image character recognition system 112 produces displayed document 212 in a high-resolution format that includes a crisp and visible foreground and a background that is nearly uniform in gradient.

Accordingly, as shown in FIG. 2B, digital image character recognition system 112 outputs enhanced digital image 216, which represents a cropped version of displayed document 212 (e.g., no other objects and backgrounds from digital image 204d are present). Furthermore, enhanced digital image 216 does not contain imperfections from digital image 204d, such as the shadow in digital image 204d. In some embodiments, enhanced digital image 216 also includes indicators for the boundary 220 and corners 218 of displayed document 212. For example, in one or more embodiments, digital image character recognition system 112 generates enhanced digital image 216 utilizing one or more approaches as described in U.S. patent application Ser. No. 15/658,289, which is incorporated by reference herein.

Although FIG. 2B only illustrates modifications to digital image 204d, in some embodiments, digital image character recognition system 112 enhances a plurality of digital images (e.g., each digital image from set of document digital images 208 from FIG. 2A). Moreover, although digital image 204d in FIG. 2B illustrates particular objects (e.g., paper and pencil) or imperfections (e.g., shadow), digital image character recognition system 112 can modify a digital image that portrays any variety of different objects or imperfections (e.g., blurring, skew, underlines, noises, lens filters, creases, and discoloration).

As mentioned above, in addition to identifying and enhancing digital images of displayed documents, digital image character recognition system 112 can utilize an orientation neural network to identify and/or correct the orientation of a displayed document in a digital image. For example, FIG. 2C illustrates utilizing an orientation neural network to identify the orientation of a displayed document (and provide the displayed document in a corrected orientation) in accordance with one or more embodiments. For instance, FIG. 2C shows digital image character recognition system 112 providing enhanced digital image 216 (from FIG. 2B) as input to orientation neural network 222. Digital image character recognition system 112 utilizes orientation neural network 222 to analyze enhanced digital image 216 and identify orientation of the document portrayed in enhanced digital image 216, (e.g., to output digital image 224 in a corrected orientation such that text of the document is aligned horizontally with characters arranged vertically, right-side-up, so that they are legible).

As illustrated in FIG. 2C, enhanced digital image 216 is incorrectly orientated (i.e., text within the displayed document within enhanced digital image 216 is upside down). As mentioned above, this can decrease the accuracy and efficiency of generating computer searchable text within the digital image. Accordingly, as shown in FIG. 2C, digital image character recognition system 112 utilizes orientation neural network 222 to analyze displayed documents (i.e., digital images of displayed documents) to identify the orientation of the displayed document.

Specifically, in the embodiment of FIG. 2C, orientation neural network 222 is a deep convolutional neural network that is trained to analyze and classify a document based on orientation. For instance, the orientation neural network is a deep CNN trained to classify documents into one of four orientation categories (e.g., 0, 90, 180, 270 degree orientation). Furthermore, where digital image character recognition system 112 has already aligned the edge of a document to a particular orientation (as discussed in FIG. 2B), digital image character recognition system 112 can utilize orientation neural network 222 to accurately and efficiently identify one of four orientation categories.

To illustrate, in relation to FIG. 2C, orientation neural network 222 generates an integer classification representing orientation of the displayed document. For example, orientation neural network 222 analyzes enhanced digital image 216 and identifies current orientation 223 as an integer value of "2" (which represents that the displayed document in enhanced digital image 216 was in a position that is currently 180 degrees from a horizontal alignment of text with characters arranged right-side-up). In one or more embodiments, orientation neural network 222 can classify a digital image of a displayed document with an integer of "0", "1", "2", or "3" to represent a current orientation as 0, 90, 180, and 270 degree rotations from a correct orientation of the displayed document. Additional detail regarding training an orientation neural network to generate an orientation classification is provided below (e.g., in relation to FIG. 3).

Moreover, in some embodiments, digital image character recognition system 112 can rotate enhanced digital image 216 into a corrected orientation after identifying the orientation of displayed document in enhanced digital image 216. For instance, digital image character recognition system 112 can rotate enhanced digital image 216 by 180 degrees to generate modified digital image 224 in a correctly orientated position.

Although the foregoing example utilizes an integer to describe a particular orientation classification, orientation neural network 222 can also output an orientation classification in a variety of forms. For example, orientation neural network 222 can identify and represent the orientation of enhanced digital image 216 in the form of an angle (so that the output is a number between 0 and 360) or some other form (e.g., text or vector). Moreover, although the foregoing example describes four classification categories, in some embodiments, orientation neural network 222 digital image character recognition system 112 can include a different number of classifications (e.g., 365 angles).

As mentioned above, in addition to utilizing an orientation neural network to identify and/or correct the orientation of a displayed document in a digital image, digital image character recognition system 112 also utilizes a word detector and text prediction neural network to generate computer searchable text. For example, FIG. 2D illustrates word detector 226 and text prediction neural network 230. Word detector 226 identifies depictions of text and crops word boxes 228 of those depictions of text from the document portrayed in modified digital image 224. Moreover, text prediction neural network 230 utilizes word boxes 228 as input to determine text in word boxes 228 and generate computer searchable text 232.

More specifically, as shown in FIG. 2D, digital image character recognition system 112 utilizes modified digital image 224 (that was previously enhanced by digital image character recognition system 112 and rotated into a correct orientation by utilizing orientation neural network 222 as described in FIGS. 2B-2C). In one or more embodiments, digital image character recognition system 112 does not utilize an enhanced (or otherwise modified) digital image in utilizing word detector 226 and text prediction neural network 230. In some embodiments, digital image character recognition system 112 utilizes a digital image with or without one or more of the enhancements/modifications described above in relation to FIGS. 2B-2C.

As illustrated in FIG. 2D, however, digital image character recognition system 112 provides modified digital image 224 of a displayed document to word detector 226. Word detector 226 analyzes the modified digital image 224 to identify and/or extract word boxes. Word detector 226 can utilize a variety of approaches to identify word boxes. To illustrate, in relation to FIG. 2D, word detector 226 utilizes a computer vision approach to identify word boxes. Specifically, word detector 226 utilizes Maximally Stable Extremal Regions ("MSER").

MSER can locate connected regions at different thresholds, or levels, of the digital image. For example, MSER detects blobs in images, where each blob is a region in a digital image that differs in properties (such as brightness, contrast, and color) compared to surrounding regions in the digital image. For example, a region (e.g., blob) might include regions of a digital image that have a higher contrast or consist of colored pixels compared to a uniform gradient surrounding (e.g., pixels that represent text on a uniform background). The MSER algorithm detects such regions in a digital image and strings them together into word and line detections. In FIG. 2D, word detector 226 crops these identified regions into separate word boxes. Furthermore, word detector 226 utilizes the MSER regions to detect spacing between regions/blobs.

Furthermore, in some embodiments, word detector 226 can utilize MSERs to detect regions where text is bright (e.g., white text) and the background is dark (e.g., colored or black background). Furthermore, in some embodiments, word detector 226 can utilize MSERs to detect regions of text where the background is not uniform (e.g., a textured background) by looking for regions that differ from that textured background. Thus, the word detector 226 can identify word boxes comprising white text on a dark (or textured) background as well as dark text on a white background.

For instance, word detector 226 can utilize MSERs to locate connected regions in modified digital image 224. Word detector 226, utilizing MSERs, detects regions of modified digital image 224 wherein pixel properties are different from that of surrounding regions within modified digital image 224. As a result, word detector 226 generates bounding boxes in such regions and crops the regions to generate word boxes 228. For example, word detector 226 detects the region portraying "Jan" and "14" and crops those regions to provide word boxes 228 for "Jan" and "14". Ultimately, in some embodiments, word detector 226 generates word boxes 228 for all detected text in modified digital image 224.

In one or more embodiments, word detector 226 can be an object detection system that includes a Region-based Convolutional Neural Network ("RCNN") that detects locations of objects in digital images. For example, the RCNN can be trained to locate objects such as text in digital images. Furthermore, in one or more embodiments, the RCNN locates objects and provides bounding boxes for the located objects.

As shown in FIG. 2D, upon identifying word boxes 228, digital image character recognition system 112 provides word boxes 228 as input to text prediction neural network 230. In some embodiments, text prediction neural network 230 only accepts fixed size digital images. Therefore, in some embodiments, word detector 226 generates word boxes in a fixed size digital image. For example, word detector 226 may include more than one word (e.g., more than one region) for each word box. Furthermore, in some embodiments, word detector 226 may separate a word (e.g., a region) into more than one word boxes if the word/region is too large to fit the fixed size input requirement of text prediction neural network 230.

Furthermore, as mentioned above, digital image character recognition system 112 provides word boxes 228 as input for text prediction neural network 230 to generate computer searchable text 232 from word boxes 228. In particular, digital image character recognition system 112 utilizes a text prediction neural network 230 trained to identify text from word boxes (e.g., images of one or more words) based on training word boxes and corresponding ground truth labels. In one or more embodiments, digital image character recognition system 112 generates synthetic training data to efficiently train the text prediction neural network 230 to identify text. Specifically, in one or more embodiments, text prediction neural network 230 comprises a stack of convolutional layers, a stock of bidirectional long short term memory layers, and a connectionist temporal classification layer trained to recognize and generate computer searchable text 232 from word boxes 228. Additional detail regarding the architecture and training of text prediction neural networks is provided below (e.g., in relation to FIGS. 5-6).

As shown in FIG. 2D, text prediction neural network 230 generates computer searchable text 232 from word boxes 228 as a data set of strings representing words depicted in word boxes 228. For example, word box 228 for "Jan" is recognized and converted to computer searchable text 232 for "Jan". Furthermore, text prediction neural network 230 also generates computer searchable text 232 for all other word boxes 228.

Upon generating computer searchable text, digital image character recognition system 112 also associates computer searchable text 232 with digital image 204*d* (the original digital image of modified digital image 224). For example, in relation to the embodiment of FIG. 2, digital image character recognition system 112 associates computer searchable text 232 by adding the text as meta-data to digital image 204*d*. Moreover, digital image character recognition system 112 creates a digital layer on digital image 204*d* that maps/overlays computer searchable text 232 onto digital image 204*d* (e.g., maps the searchable text in the same location of word boxes 228 within the digital image 204*d*). Furthermore, digital image character recognition system 112 associates computer searchable text 232 as a token in an index corresponding to the digital image 204*d*. Additionally, digital image character recognition system 112 stores modified digital image 224 (e.g., on server(s) 102 via on online content management system 104) as a digital image.

Moreover, in one or more embodiments, digital image character recognition system 112 can also utilize the generated computer searchable text 232 for various functionalities such as, but not limited to, searching the content of digital images, selecting words within digital images to copy and paste, and organizing/distributing digital images based on computer searchable text within a digital image. Examples of such functionalities are discussed in further detail below (e.g., in relation to FIGS. 8 and 9).

Figure 3:
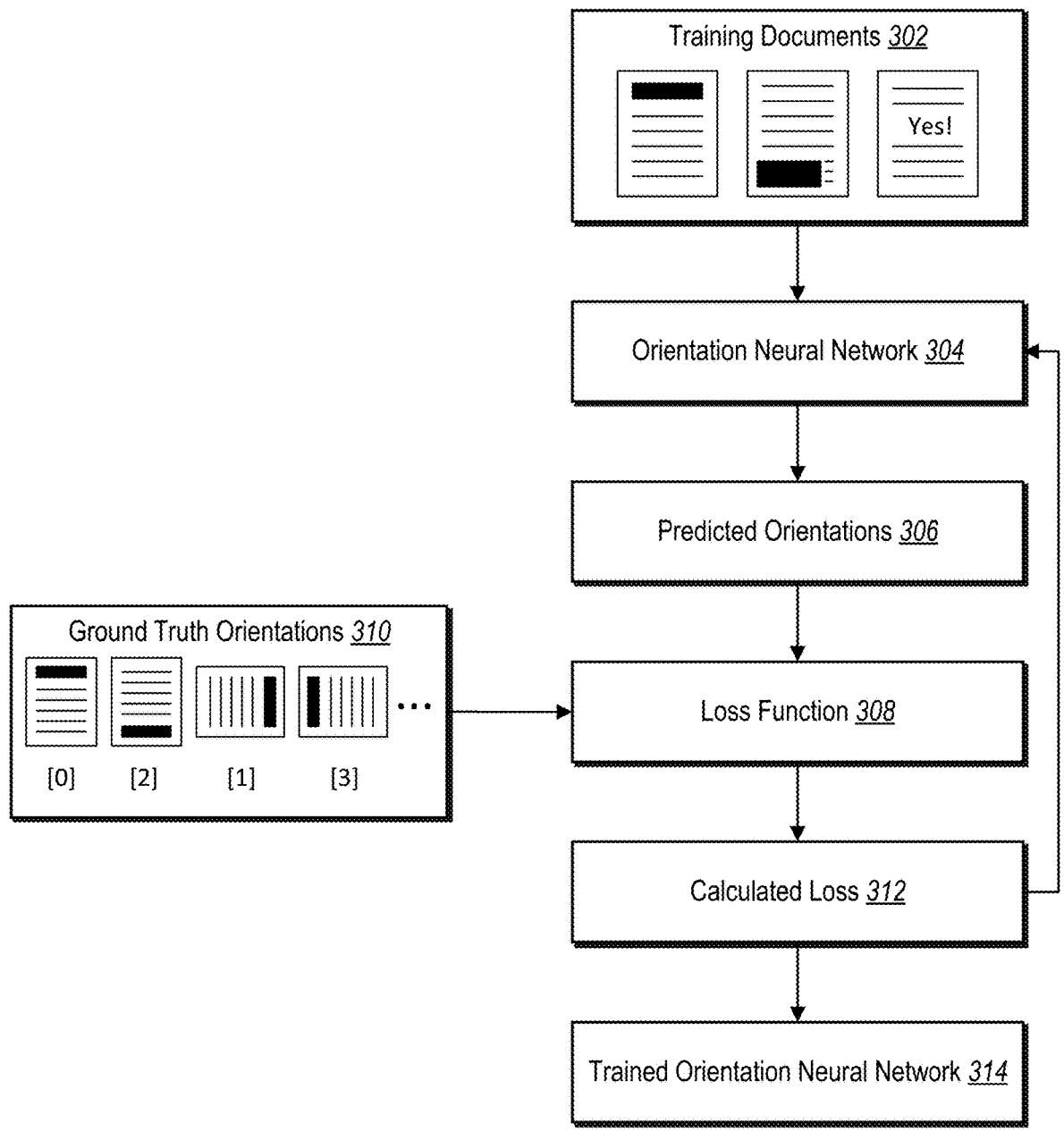
FIG. 3 illustrates training an orientation neural network in accordance with one or more embodiments.

As just mentioned, digital image character recognition system 112 can train an orientation neural network to identify the orientation of displayed documents in digital images. For example, as shown in FIG. 3, digital image character recognition system 112 trains an orientation neural network to generate a trained orientation neural network in accordance with one or more embodiments. In particular, as illustrated in FIG. 3, digital image character recognition system 112 utilizes training documents 302, predicted orientations 306, ground truth orientations 310, and calculated loss 312 to train orientation neural network 304 and generate trained orientation neural network 314.

For example, as shown in FIG. 3, digital image character recognition system 112 accesses training documents 302. In one or more embodiments, digital image character recognition system 112 can access training documents 302 from storage in server(s) 102. Furthermore, training documents 302, in one or more embodiments, are documents with associated ground truth orientations 310. As shown, training documents 302 include documents having multiple orientations. In some embodiments, training documents 302 are in either a 0, 90, 180, or 270 degree orientation (relative to horizontal, upright orientation of text in the documents), however, in some embodiments, training documents 302 can have a different orientation.

In one or more embodiments, training documents 302 are generated by digital image character recognition system 112. In particular, digital image character recognition system 112 can modify orientation of existing documents to generate training documents 302 and corresponding ground truth orientations. Additional detail regarding generating training documents 302 is described below (e.g., in relation to FIG. 4). Furthermore, training documents 302, in some embodiments, can be documents obtained from other third-party repositories or from online content management system 104 where the documents are annotated with the ground truth orientation of the document.

Furthermore, as illustrated in FIG. 3, digital image character recognition system 112 utilizes training documents 302 to train orientation neural network 304. In particular, digital image character recognition system 112 provides training documents 302 as input to the orientation neural network 304. In one or more embodiments, orientation neural network 304 analyzes training documents 302 to predict the orientation of training documents 302.

In relation to FIG. 3, orientation neural network 304 comprises a deep convolutional neural network. Specifically, the orientation neural network 304 comprises a deep CNN that includes convolutional layers, pooling layers, fully connected layers, ReLu layers, and normalization layers, that feed to an output layer that produces a predicted orientation.

In one or more embodiments, digital image character recognition system 112 utilizes orientation neural network 304 that is a deep neural network based on the Inception Resnet v2 architecture. The deep neural network based on the Inception Resnet v2 architecture can be utilized for image classification. However, in some embodiments, digital image character recognition system 112 modifies the last layer in the deep neural network based on the Inception Resnet v2 architecture to classify orientation instead of classifying an image into content categories. Additionally, the deep neural network can be trained using the ImageNet database. In some embodiments, digital image character recognition system 112 tunes the ImageNet database to train a deep neural network to be biased towards orientation detection.

More specifically, as shown in FIG. 3, orientation neural network 304 generates predicted orientations 306 after analyzing training documents 302. In one or more embodiments, predicted orientations 306 can be in the form of an integer, a string, a number (e.g., an angle), or other data that represents the direction in which one or more training documents 302 are positioned.

Additionally, as shown in FIG. 3, orientation neural network 304 utilizes training documents 302, predicted orientations 306, and ground truth orientations 310 to learn to accurately predict the orientation of displayed documents in digital images. For example, digital image character recognition system 112 compares predicted orientations 306 and ground truth orientation 310 (e.g., labeled orientation integers of training documents) to train orientation neural network 304. In particular, digital image character recognition system 112 compares predicted orientations 306 and ground truth orientations 310 utilizing loss function 308, which generates calculated loss 312. In particular, loss function 308 can determine if predicted orientations 306 from orientation neural network 304 accurately reflect the ground truth orientations 310 of the training documents 302. Digital image character recognition system 112 can utilize a variety of loss functions, including squared error loss function, 0-1 indicator function, or cross entropy loss function to determine calculated loss 312.

Moreover, orientation neural network 304 then utilizes calculated loss 312 to train (e.g., tune) orientation neural network 304 in predicting the orientation of displayed documents. In particular, digital image character recognition system 112 provides information from calculated loss 312 to orientation neural network 304 (e.g., back-propagates calculated loss 312) to adjust parameters of orientation neural network 304. In particular, the orientation neural network 304 can modify internal parameters (e.g., weighting parameters for analyzing features within layers of the neural network) to minimize calculated loss 312 from loss function 308.

In one or more embodiments, digital image character recognition system 112 utilizes the orientation neural network 304 to repeatedly generate predicted orientations 306, compares predicted orientations 306 with ground truth orientations 310, and modifies internal parameters to minimize calculated loss 312. Digital image character recognition system 112 repeats this process until orientation neural network 304 is sufficiently accurate (e.g., until convergence or until analyzing a threshold number of training documents). In this manner, digital image character recognition system 112 generates trained orientation neural network 314.

Figure 4:
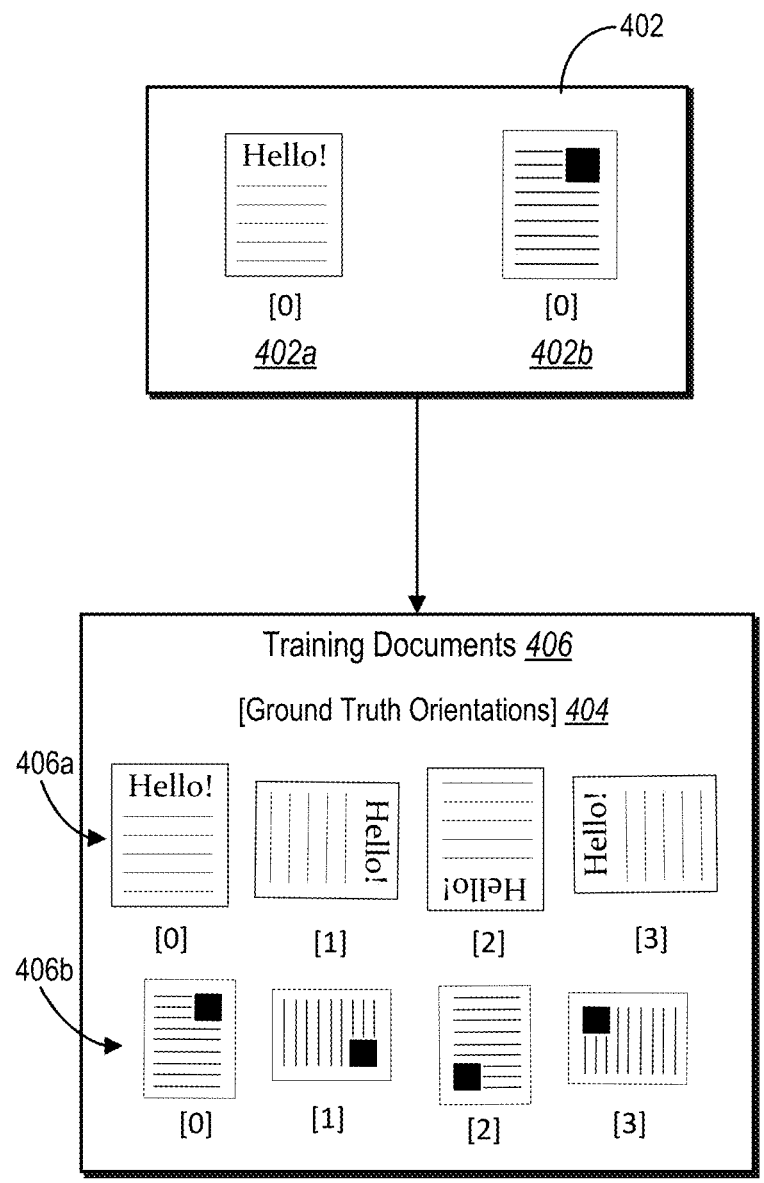
FIG. 4 illustrates generating training documents for an orientation neural network in accordance with one or more embodiments.

As mentioned above, digital image character recognition system 112 can generate training documents to train an orientation neural network. For example, FIG. 4 illustrates digital image character recognition system 112 generating training documents to train an orientation neural network in accordance with one or more embodiments. Specifically, FIG. 4 illustrates digital image character recognition system 112 utilizing initial documents 402 to generate training documents 406 and corresponding ground truth orientations 404.

More specifically, as shown in FIG. 4, digital image character recognition system 112 utilizes initial documents 402 at a known orientation to generate training documents 406 to train an orientation neural network. Digital image character recognition system 112 can identify initial documents 402 from a variety of sources. For example, in one or more embodiments, digital image character recognition system 112 identifies initial documents 402 from a third party resource or from documents stored by online content management system 104. Moreover, digital image character recognition system 112 can identify initial documents 402 together with a known orientation. For instance, digital image character recognition system 112 can capture documents previously reviewed or annotated for correct orientation (e.g., capture documents that users have already manually rotated to a correct orientation in interacting with online content management system 104). As shown in FIG. 4, initial documents 402a and 402b are both labeled with an orientation of 0 (indicating that text in the documents are positioned horizontal with upright characters).

As shown in FIG. 4, digital image character recognition system 112 can generate training documents 406 and corresponding ground truth orientations 404 by rotating initial documents 402. In particular, digital image character recognition system 112 can rotate initial documents 402 by increments of 90 degrees and generate a training document with corresponding ground truth label at each rotation. For example, as shown in FIG. 4, digital image character recognition system 112 generates ground truth training documents 406a from initial document 402a. In particular, digital image character recognition system 112 generated ground truth training documents 406a by rotating initial document 402a in increments of 90 degrees and generating ground truth orientations 404 at each rotation (e.g., initial document 402a at a known orientation was at a position of "0" and digital image character recognition system 112 generates four training documents 406a with ground truth orientations of "0", "1", "2", and "3"). Similarly, digital image character recognition system 112 generates ground truth training documents 406b by rotating and labeling initial document 402b. Although FIG. 4 illustrates a particular number of training documents at particular orientations, ground truth training documents 406 can include any number of documents and any variety of orientations.

Figure 5:
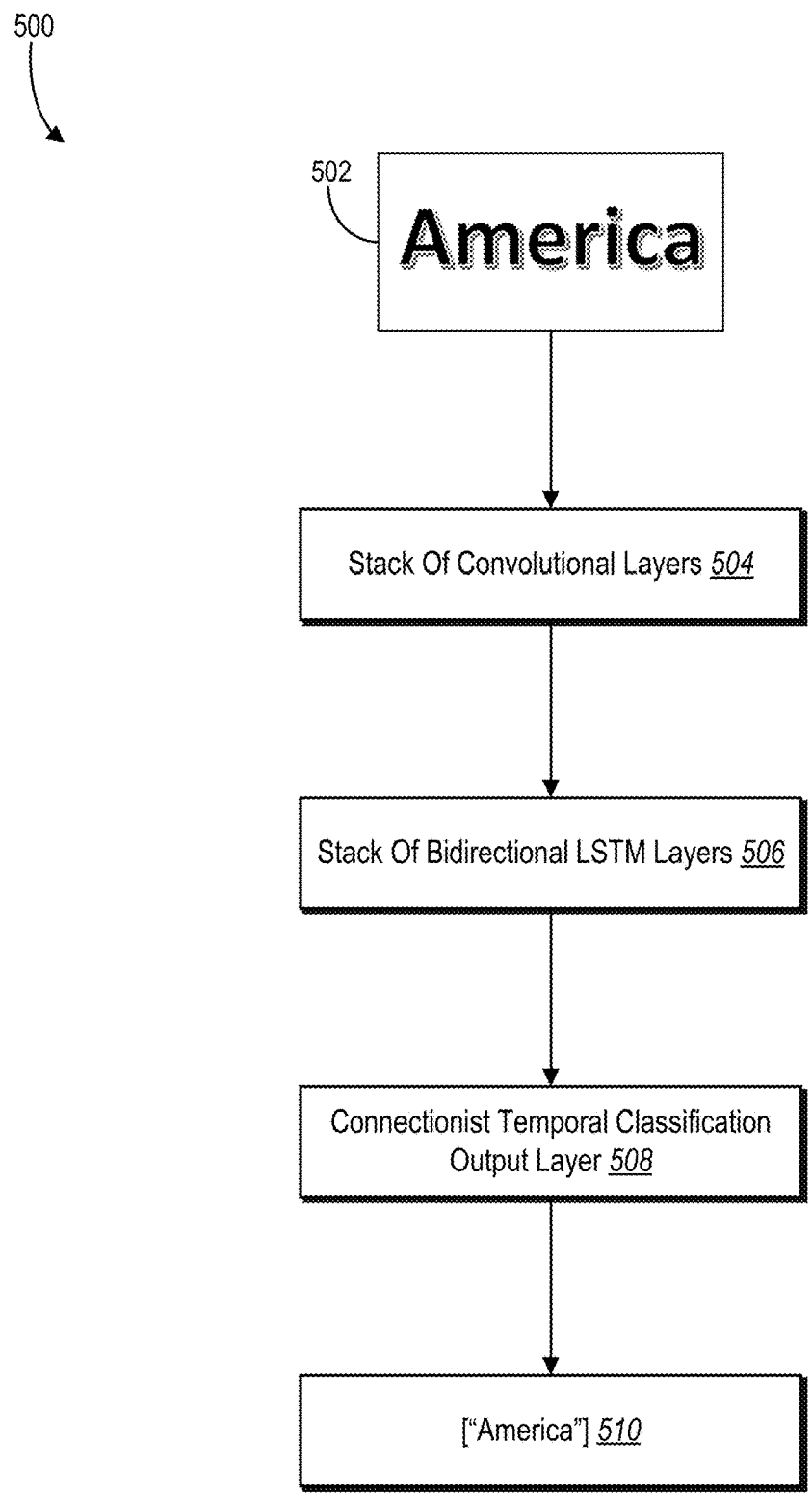
FIG. 5 illustrates utilizing a text prediction neural network to generate computer searchable text in accordance with one or more embodiments.

As mentioned above, digital image character recognition system 112 utilizes text prediction neural network 230 (e.g., word deep net) to generate computer searchable text from a digital image. FIG. 5 provides additional detail regarding exemplary architecture of text prediction neural network 500 utilized to generate computer searchable text from a digital image depicting words (e.g., a word box). More specifically, as shown in FIG. 5, digital image character recognition system 112 provides word box 502 to text prediction neural network 500 comprising stack of convolutional layers 504, stack of bidirectional long short term memory ("LSTM") layers 506, and connectionist temporal classification output layer 508 to generate computer searchable text 510 from word box 502.

For example, as shown in FIG. 5, digital image character recognition system 112 provides word box 502 to text prediction neural network 500 (e.g., a word box generated as described in FIG. 2D). In one or more embodiments, digital image character recognition system 112 provides word box 502 in a fixed digital image size. However, in some embodiments, text prediction neural network 500 can accept word box 502 in different digital image sizes as input. Furthermore, in one or more embodiments, if word box 502 includes more than one word (e.g., "Made in America"), digital image character recognition system 112 can utilize word detector 226 to further separate the digital image into individual word boxes of single words (e.g., a word box for "Made", "in", and "America"). In some embodiments, digital image character recognition system 112 can resize the individual word boxes of single words into the appropriate input size for text prediction neural network 500. As shown in FIG. 5, word box 502 is a digital image portraying the word "America" (e.g., a digital image of a word from a document portrayed in a digital image).

As just mentioned, text prediction neural network 500, in some embodiments, can provide word box 502 as input into stack of convolutional layers 504 that analyze features of the word box 502. For instance, in one or more embodiments, stack of convolutional layers 504 includes convolutional layers that produce feature maps from a digital image (e.g., word box 502). Furthermore, stack of convolutional layers 504, in some embodiments, can filter (e.g., weight) and analyze features at different levels of abstraction. The stack of convolutional layers 504 can generate a set of visual features for further analysis (e.g., by the bidirectional LSTM layers 506).

Additionally, in some embodiments, stack of convolutional layers 504 also includes other layers such as pooling layers, fully connected layers, ReLu layers, normalization layers, and other layers. For instance, in one or more embodiments, stack of convolutional layers 504 can provide output from a layer to a pooling layer. In some embodiments, a pooling layer down samples a feature map or layer to lessen spatial dimensions and to control overfitting. Furthermore, in one or more embodiments, stack of convolutional layers 504 can include a ReLu layer. In particular, a ReLu layer, in some embodiments, can increase non-linear properties in the neural network/machine learning model. Furthermore, in alternate embodiments, stack of convolutional layers 504 can include other layers such as, but not limited to, normalization layers and loss layers.

Moreover, in some embodiments, stack of convolutional layers 504 also includes one or more fully connected layers. In particular, in some embodiments, the fully connected layer receives input from all layers and outputs probabilities for different classifications in word box 502. For example, in some embodiments, a fully connected layer can output a vector of classes with probabilities. More specifically, in some embodiments, the vector of classes can include classes such as, but not limited to, characters in an ASCII table, letters of the alphabet, or numbers. Furthermore, the fully connected layer in stack of convolutional layers 504 can produce a predicted probability of the presence of the above mentioned classes in word box 502. In one or more embodiments, stack of convolutional layers 504 determines a classification for text depicted within word box 502.

Additionally, in one or more embodiments, text prediction neural network 500 can utilize stack of bidirectional LSTM layers 506. For example, in some embodiments, text prediction neural network 500 can provide output from stack of convolutional layers 504 to stack of bidirectional LSTM layers 506. In one or more embodiments, text prediction neural network 500 utilizes stack of bidirectional LSTM layers 506 to, but not limited to, recognize/correct for fragmented text characters, recognize/correct for grammar, and recognize/correct for sentence structure. In some embodiments, stack of bidirectional LSTM layers 506 includes an implementation of an RNN that is capable of learning long-term dependencies. For instance, in some embodiments, word detector 226 may generate word boxes of more than one word or may fragment words in separate word boxes (e.g., generating two word boxes for a digital image portraying "Hello, I live in America", wherein the first word box includes "Hello, I liv" and the second word box includes "e in America"). As a result, in some embodiments, stack of bidirectional LSTM layers 506 can recognize/correct the word boxes (or the classification output from stack of convolutional layers 504) including "Hello, I liv" and "e in America" to "Hello, I live in America".

More specifically, in one or more embodiments, stack of bidirectional LSTM layers 506 includes a memory cell, an input gate, an output gate, and a forget gate. In some embodiments, the memory cell can store values (e.g., information such as a classification output from stack of convolutional layers 504 or word box 502). In some embodiments, the input gate decides values that are added or updated in the memory cell. Moreover, in one or more embodiments, the forget gate controls whether or not to keep certain values within the memory cell (i.e., the forget gate can decide to keep or remove values/information from the memory cell). Furthermore, in some embodiments, the output gate decides what values/information bidirectional LSTM layers 506 will output. In some embodiments, each gate and memory cell are connected to each other and each gate and memory cell contain separate parameters. In one or more embodiments, stack of bidirectional LSTM layers 506 can include one or more gates to identify separate features such as verbs, nouns, context of sentences, and so forth.

Moreover, in some embodiments, text prediction neural network 500 can utilize connectionist temporal classification output layer 508. In particular, in some embodiments, connectionist temporal classification output layer 508 includes a neural network that outputs a conditional probability distribution over label sequences from input of other neural networks such as an RNN or stack of bidirectional LSTM layers 506. For instance, in one or more embodiments, connectionist temporal classification output layer 508 can predict the sequence of text portrayed in word boxes 502. Moreover, in some embodiments, if word box 502 consisted of two word boxes representing "America" and "made in", connectionist temporal classification output layer 508 can predict the sequence of text and output "made in America".

Furthermore, in some embodiments, text prediction neural network 500 utilizes a modified connectionist temporal classification output layer 508. In particular, in one or more embodiments, connectionist temporal classification output layer 508 provides a confidence score in addition to the generated computer searchable text 510. For example, in some embodiments, text prediction neural network 500 can utilize the confidence score to utilize generated predictions, filter out predictions, or utilize a lexicon for better accuracy. More specifically, in some embodiments, if the confidence score is above a threshold, text prediction neural network 500 will utilize computer searchable text 510. Moreover, in some embodiments, if the confidence score is below a threshold, text prediction neural network 500 filters out computer searchable text 510 and assumes that computer searchable text 510 was a noise prediction. Furthermore, in one or more embodiments, if the confidence score was not above or below a threshold amount, text prediction neural network 500 utilizes a lexicon generated from a dictionary such as, but not limited to, the Oxford English Dictionary to evaluate computer searchable text 510. For example, text prediction neural network 500, in some embodiments, transforms (e.g., combining or splitting) words in computer searchable text 510 to find a matching word in the lexicon.

Ultimately, as shown in FIG. 5, digital image character recognition system 112 can utilize text prediction neural network 500 to generate computer searchable text from word boxes (e.g., digital images portraying text). As illustrated in FIG. 5, text prediction neural network 500 provides word box 502 to stack of convolutional layers 504, stack of bidirectional LSTM layers 506, and connectionist temporal classification output layer 508 to generate computer searchable text 510. In some embodiments, computer searchable text 510 is a string representing the predicted text from word box 502 (e.g., "America"). In one or more alternate embodiments, text prediction neural network 500 can provide more than one word boxes 502 to the stack of convolutional layers 504, stack of bidirectional LSTM layers 506, and connectionist temporal classification output layers 508. Moreover, in some embodiments, text prediction neural network 500 can predict and sequence the more than one word boxes 502 to generate computer searchable text 510 represented as multiple strings, one string of data, or any other combination of text data.

Alternatively, in one or more embodiments, text prediction neural network 500 can generate computer searchable text 510 from word box 502 while utilizing any combination of stack of convolutional layers 504, stack of bidirectional LSTM layers 506, and/or connectionist temporal classification output layer 508. For example, text prediction neural network 500 can generate computer searchable text 510 from word box 502 by utilizing only stack of convolutional layers 504 and stack of bidirectional LSTM layers 506.

Figure 6:
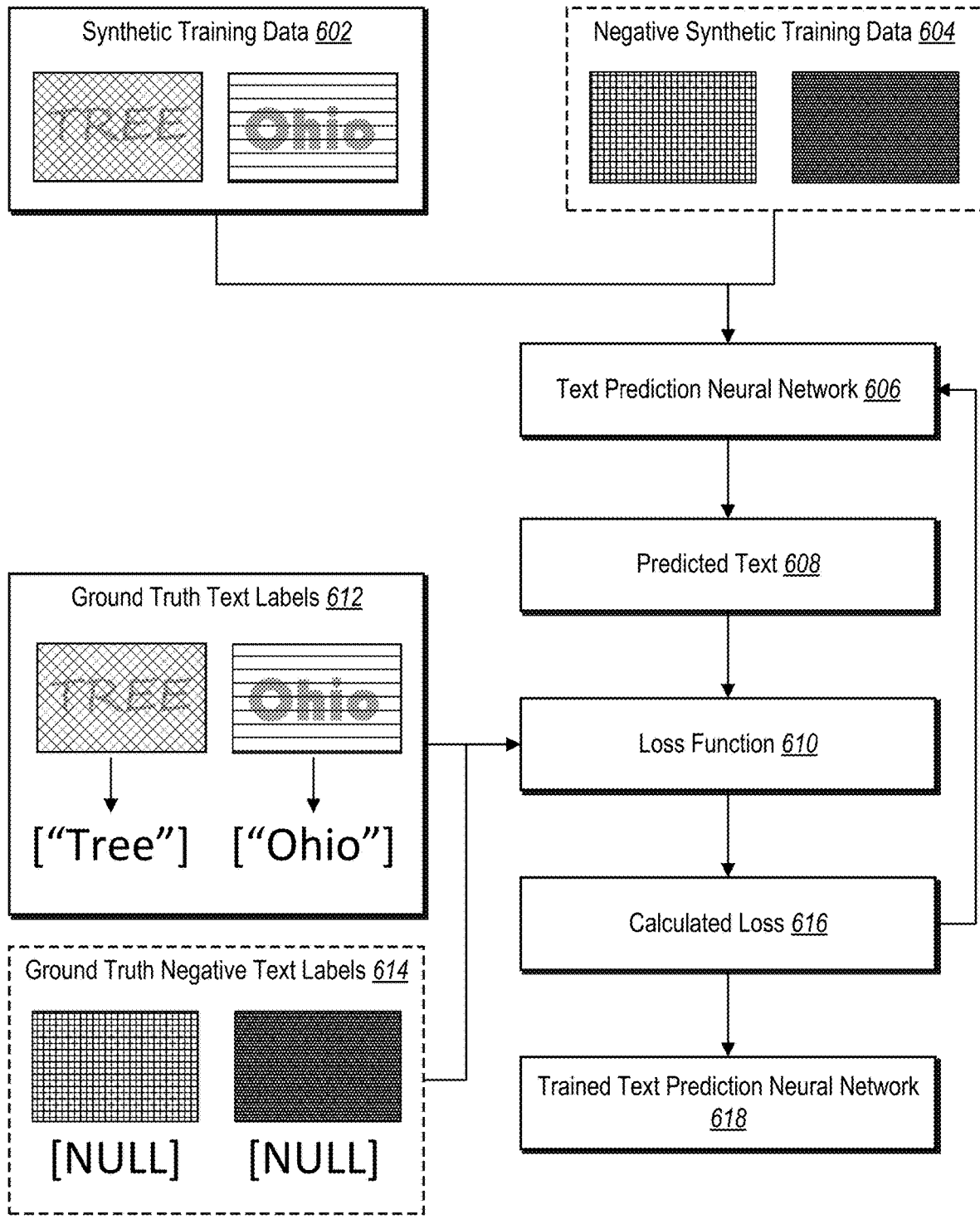
FIG. 6 illustrates training a text prediction neural network in accordance with one or more embodiments.

As just mentioned, digital image character recognition system 112 can also train a text prediction neural network to generate computer searchable text from digital images. For example, as shown in FIG. 6, digital image character recognition system 112 trains a text prediction neural network to generate a trained text prediction neural network in accordance with one or more embodiments. In particular, as illustrated in FIG. 6, digital image character recognition system 112 utilizes synthetic training data 602, predicted text 608, ground truth text labels 612, and calculated loss 616 to train text prediction neural network 606 to generate trained text prediction neural network 618.

As shown in FIG. 6, digital image character recognition system 112 accesses synthetic training data 602. In one or more embodiments, digital image character recognition system 112 can access synthetic training data 602 from storage in server(s) 102. Furthermore, synthetic training data 602, in some embodiments, are digital images portraying text (e.g., word boxes) with an associated ground truth text label (e.g., ground truth text label 612). Additionally, in one or more embodiments, synthetic training data 602 can include many (e.g., hundreds or millions) digital images with unique variations. Additional detail regarding generating synthetic training data 602 is provided below (e.g., in relation to FIG. 7).

Although FIG. 6 illustrates utilizing synthetic training data 602, digital image character recognition system 112 can also utilize observed (e.g., non-synthetic) training data. For example, digital image character recognition system 112 can access training data (e.g., digital images) from a third-party repository or from online content management system 104 where the obtained digital images are annotated with the ground truth text label for the corresponding digital images.

Furthermore, as illustrated in FIG. 6, digital image character recognition system 112 utilizes synthetic training data 602 to train text prediction neural network 606. In one or more embodiments, digital image character recognition system 112 provides synthetic training data 602 (or observed training data) as input to text prediction neural network 606. Furthermore, in one or more embodiments, text prediction neural network 606 analyzes synthetic training data 602 to generate predicted text 608 (e.g., computer searchable text) in accordance with the methods described in FIG. 5.

Moreover, as shown in FIG. 6, text prediction neural network 606 can utilize synthetic training data 602, predicted text 608, and ground truth text labels 612 to learn to accurately recognize and generate computer searchable text from digital images that depict documents. For instance, digital image character recognition system 112 compares predicted text 608 and ground truth text labels 612 for corresponding synthetic training data 602 utilizing loss function 610 to generate calculated loss 616. More specifically, loss function 610 can determine a measure of error between predicted text 608 generated by the text prediction neural network 606 and the ground truth text label 612 for synthetic training data 602.

Furthermore, text prediction neural network 606 then utilizes calculated loss 616 to train (e.g., tune) text prediction neural network 606 in generating computer searchable text from digital images that include text. In particular, digital image character recognition system 112 provides information from calculated loss 616 (e.g., back-propagates) to text prediction neural network 606 to adjust parameters (e.g., weighting parameters for analyzing features within layers of the neural network) of text prediction neural network 606.

In some embodiments, digital image character recognition system 112 repeatedly utilizes text prediction neural network 606 to generate predicted text 608 from text prediction neural network 606, compare predicted text 608 with ground truth text labels 612, and tune parameters to minimize calculated loss 616. Digital image character recognition system 112 repeats this process until text prediction neural network 606 is sufficiently accurate (e.g., until convergence or through a threshold number of iterations).

Additionally, in one or more embodiments, as shown in FIG. 6, digital image character recognition system 112 can also train text prediction neural network 606 with negative synthetic training data 604 and ground truth negative text labels 614. In particular, digital image character recognition system 112, in some embodiments, can utilize both synthetic training data 602 and negative synthetic training data 604. For example, in some embodiments, negative synthetic training data 604 includes images of textures that do not portray text. Similarly, ground truth negative text labels 614 are labeled to indicate that there is no text portrayed in negative synthetic training data 604 (e.g., NULL). Digital image character recognition system 112, in some embodiments, utilizes negative synthetic training data 604 to train text prediction neural network 606 to recognize when there is no portrayed text in a word box.

For example, digital image character recognition system 112 can provide negative synthetic training data to text prediction neural network 606. Text prediction neural network 606 can generate predicted text 608 (e.g., a text prediction or a null prediction). Digital image character recognition system 112 can compare ground truth negative text labels 614 with predicted text 608 (via loss function 610) and train text prediction neural network 606 (e.g., by modifying parameters to reduce calculated loss 616). In this manner, digital image character recognition system 112 can generate trained text prediction neural network 618 trained to identify text (or identify non-text) portrayed in word boxes.

Figure 7:
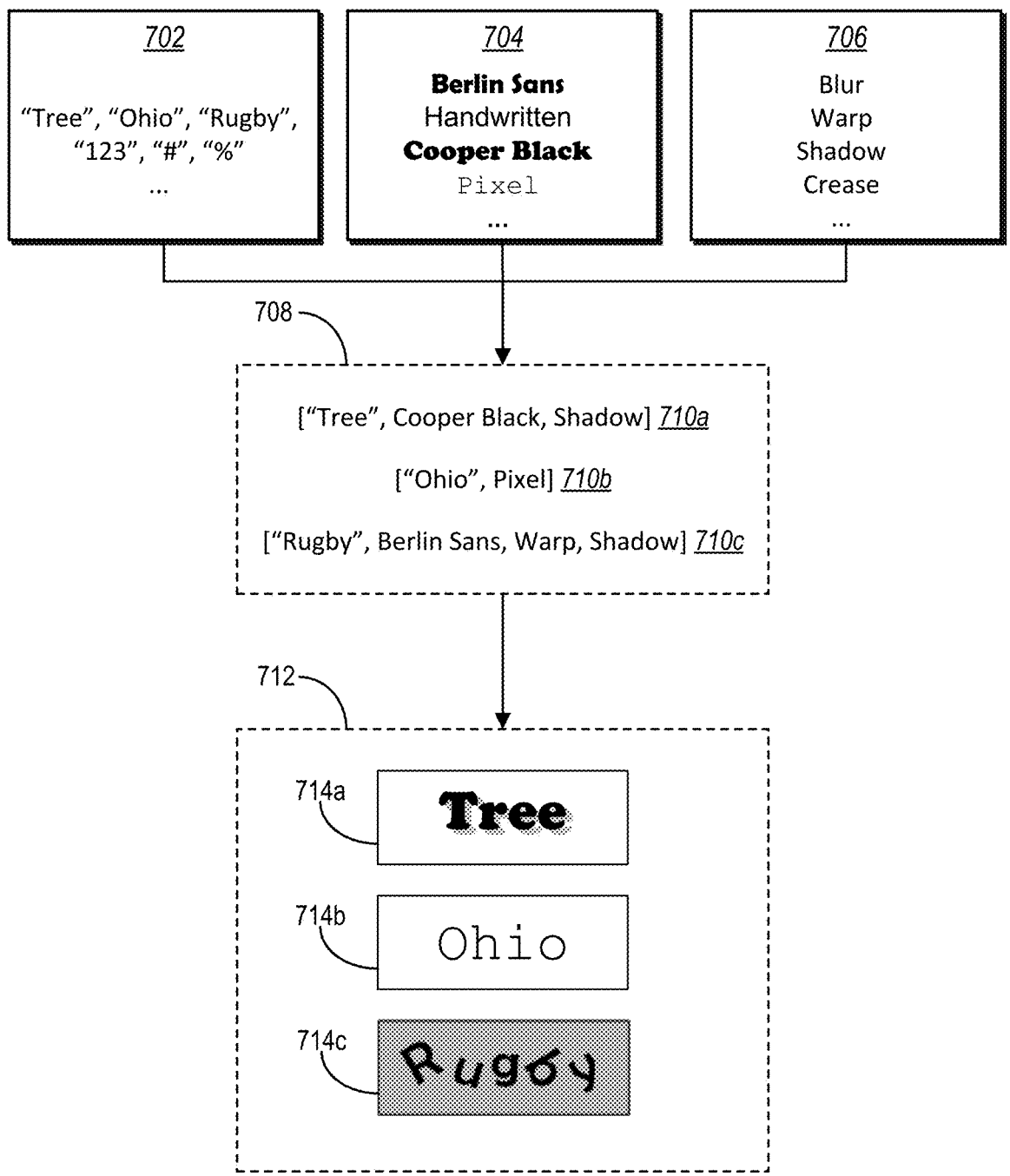
FIG. 7 illustrates generating synthetic training data for a text prediction neural network in accordance with one or more embodiments.

As mentioned above, digital image character recognition system 112 can generate synthetic training data to train a text prediction neural network. For example, FIG. 7 illustrates digital image character recognition system 112 generating synthetic training data for a text prediction neural network in accordance with one or more embodiments. As shown in FIG. 7, digital image character recognition system 112 utilizes corpus of words 702, set of fonts 704, and set of distortions 706 to generate synthetic training data 712.

As just mentioned, in relation to FIG. 7, digital image character recognition system 112 utilizes corpus of words 702. As shown, corpus of words 702 includes words from the English language. In particular, corpus of words 702 includes words from the English language and other text characters incidental to the English language (e.g., numbers, punctuation, and symbols). In one or more alternate embodiments, corpus of words 702 can also include abbreviations, acronyms, or other word and/or character modifications. For instance, in one or more embodiments, digital image character recognition system 112 utilizes the Uniform Product Code (UPC) in order to generate synthetic training data 712 that resembles receipts to train the text prediction neural network to recognize receipts and receipt contents. Furthermore, corpus of words 702, in some embodiments, can include numerous word entries from multiple sources (e.g., literature, dictionaries, and online databases).

As shown in FIG. 7, digital image character recognition system 112 also utilizes set of fonts 704. As illustrated, set of fonts 704 includes a variety of fonts (e.g., computer fonts, machine printed fonts, or handwritten fonts). For example, in some embodiments, set of fonts 704 includes more common fonts such as, but not limited to, Times New Roman and Helvetica and also includes less common or unique fonts such as ornate logo fonts and different sets of handwritten calligraphy font styles. Also, in one or more embodiments and as shown in FIG. 7, set of fonts 704 includes fonts that are commonly utilized by receipts or thermal printers (e.g., the font "pixel" in set of fonts 704).

Furthermore, as illustrated in FIG. 7, digital image character recognition system 112 also utilizes set of distortions 706. Set of distortions 706 includes both geometric and photometric transformations applicable to a digital image. For example, as shown in FIG. 7, set of distortions 706 includes transformations such as blur, warp, shadow, skew, and creases. In one or more embodiments, set of distortions 706 may include numerous types of distortions from multiple sources. Moreover, in some embodiments, set of distortions 706 include distortions that simulate real world distortions on digital images. For example, the digital image character recognition system 112 can apply a set of distortions to a digital image to cause a shadow on the digital image (and the words depicted in the digital image). Furthermore, the digital image character recognition system 112 can apply a set of distortions to a digital image to cause the glare on the digital image. In some embodiments, the digital image character recognition system 112 can cause numerous distortions to simulate real world distortions to digital images depicting a document and/or words such as, but not limited to, water damaged paper, rust, ink smear, blurry digital images, wrinkles, and/or fading ink.

As mentioned above, digital image character recognition system 112 utilizes corpus of words 702, set of fonts 704, and set of distortions 706 to generate word-font-distortion sample sets 708. For example, as shown in FIG. 7, digital image character recognition system 112 selects words from corpus of words 702, fonts from set of fonts 704, and distortions from set of distortions 706 to generate word-font-distortion sample sets 708. To illustrate, as shown in FIG. 7, in some embodiments, digital image character recognition system 112 can select the word "Tree", the font "Cooper Black", and the distortion "shadow" to generate word-font-distortion sample set 710a.

Furthermore, in one or more embodiments, digital image character recognition system 112 can generate word-font-distortion sample sets 708 with any combination of one or more words, one or more fonts, and/or one or more distortions from corpus of words 702, set of fonts 704, and set of distortions 706. For instance, in some embodiments, digital image character recognition system 112 can select the word "Ohio" and the font "Pixel" without selecting a distortion to generate word-font-distortion sample set 710b. Similarly, digital image character recognition system 112 can select the word "Rugby", the font "Berlin Sans", and the distortions "warp" and "shadow" to generate word-font-distortion sample set 710c. In one or more embodiments, digital image character recognition system 112 can generate word-font-distortion sample sets 708 without selecting words from corpus of words 702 in order to generate negative synthetic training data (e.g., a digital image without a word).

Additionally, in some embodiments, digital image character recognition system 112 can utilize a frequency system to generate word-font-distortion sample sets 708. In particular, digital image character recognition system 112, in one or more embodiments, utilizes the frequency system to determine the frequency of words, fonts, and distortions from corpus of words 702, set of fonts 704, and set of distortions 706 occurring in real world settings. For example, in some embodiments, the frequency of words, fonts, and distortions includes, but is not limited to, a percentage of times a word, font, or distortion occurs in a real world setting. In particular, digital image character recognition system 112 can determine that certain fonts, such as Helvetica or Times New Roman occur more frequently in real world settings in comparison to other fonts (e.g., a higher percentage of known occurrences where Helvetica or Times New Roman is utilized). Similarly, digital image character recognition system 112 can determine words and distortions that occur more frequently in real world settings in comparison to other words and distortions. Moreover, digital image character recognition system 112 can utilize the determined frequencies of words, fonts, and distortions to generate word-font-distortion sample sets 708 that more often include words, fonts, or distortions that are above a determined threshold frequency (e.g., weight sampling of words, fonts, or distortions based on frequency of utilization).

Moreover, digital image character recognition system 112 utilizes generated word-font-distortion sample sets 708 to generate synthetic training data 712. For example, in some embodiments, digital image character recognition system 112 utilizes word-font-distortion sample sets 710a, 710b, and 710c to generate synthetic training digital images 714a, 714b, and 714c. For example, a word-font-distortion sample set can include any combination of one or more words, one or more fonts, and/or one or more distortions. In particular, in some embodiments, digital image character recognition system 112 generates synthetic training data by applying a selected font and a distortion to a selected word. For instance, as shown in FIG. 7, digital image character recognition system 112 applies the selected font "Cooper Black" and the distortion "shadow" (in word-font-distortion sample set 710a) to the selected word "Tree" (from wordfont-distortion sample set 710*a*) to generate synthetic training digital image 714*a*. Similarly, digital image character recognition system 112 applies the selected font "Pixel" in word-font-distortion sample set 710*b* on the selected word "Ohio" to generate synthetic training digital image 714*b*.

Additionally, in one or more embodiments, digital image character recognition system 112 can apply distortions from set of distortions 706 directly on synthetic training data 712 (e.g., directly on a digital image to transform the digital image as a whole). For example, digital image character recognition system 112 applies selected font "Berlin Sans" and a selected distortion "warp" in word-font-distortion sample set 710*c* on the selected word "Rugby" to generate the modified word in synthetic training digital image 714*c*. Furthermore, digital image character recognition system 112 can also apply the selected distortion "shadow" in word-font-distortion sample set 710*c* directly onto synthetic training digital image 714*c* to give synthetic training digital image 714*c* the shadow effect (as shown in FIG. 7). In one or more embodiments, digital image character recognition system 112 can apply any combination of words, fonts, and/or distortions to generate synthetic training data (e.g., hundreds or millions of training word boxes).

Furthermore, in alternate embodiments, digital image character recognition system 112 can utilize an alternative corpus of words in a different language to generate synthetic training data for other languages. For example, although FIG. 7 illustrates generating synthetic training data in English, digital image character recognition system 112 can quickly and efficiently generate training data for other languages (and thus generate trained text prediction neural networks for alternative languages). Moreover, by swapping corpus of words 702 for a second corpus of words in a second language (e.g., German or French), digital image character recognition system 112 can generate synthetic training data for the second language. In particular, digital image character recognition system 112 can generate word-font-distortion sample sets from the second corpus of words 702, set of fonts 704, and set of distortions 706. Digital image character recognition system 112 can then apply the word-font-distortion sample sets to generate synthetic training data in the second language.

Additionally, as mentioned above, in some embodiments, digital image character recognition system 112 can generate word-font-distortion sample sets 708 without selecting words from corpus of words 702 in order to generate negative synthetic training data. For example, in some embodiments, digital image character recognition system 112 can generate negative synthetic training data by generating word-font-distortion sample sets 708 that include distortions from set of distortions 706 without selecting words or fonts. Moreover, in some embodiments, digital image character recognition system 112 generates negative synthetic training data by applying selected distortions from generated word-font-distortion sample sets 708 directly on a digital image. For example, in one or more embodiments, digital image character recognition system 112 can generate negative synthetic training data by applying a distortion such as textures (e.g., wood, marble countertops, carpet designs, and so forth) to a digital image (e.g., a digital image without text).

Figure 8A:
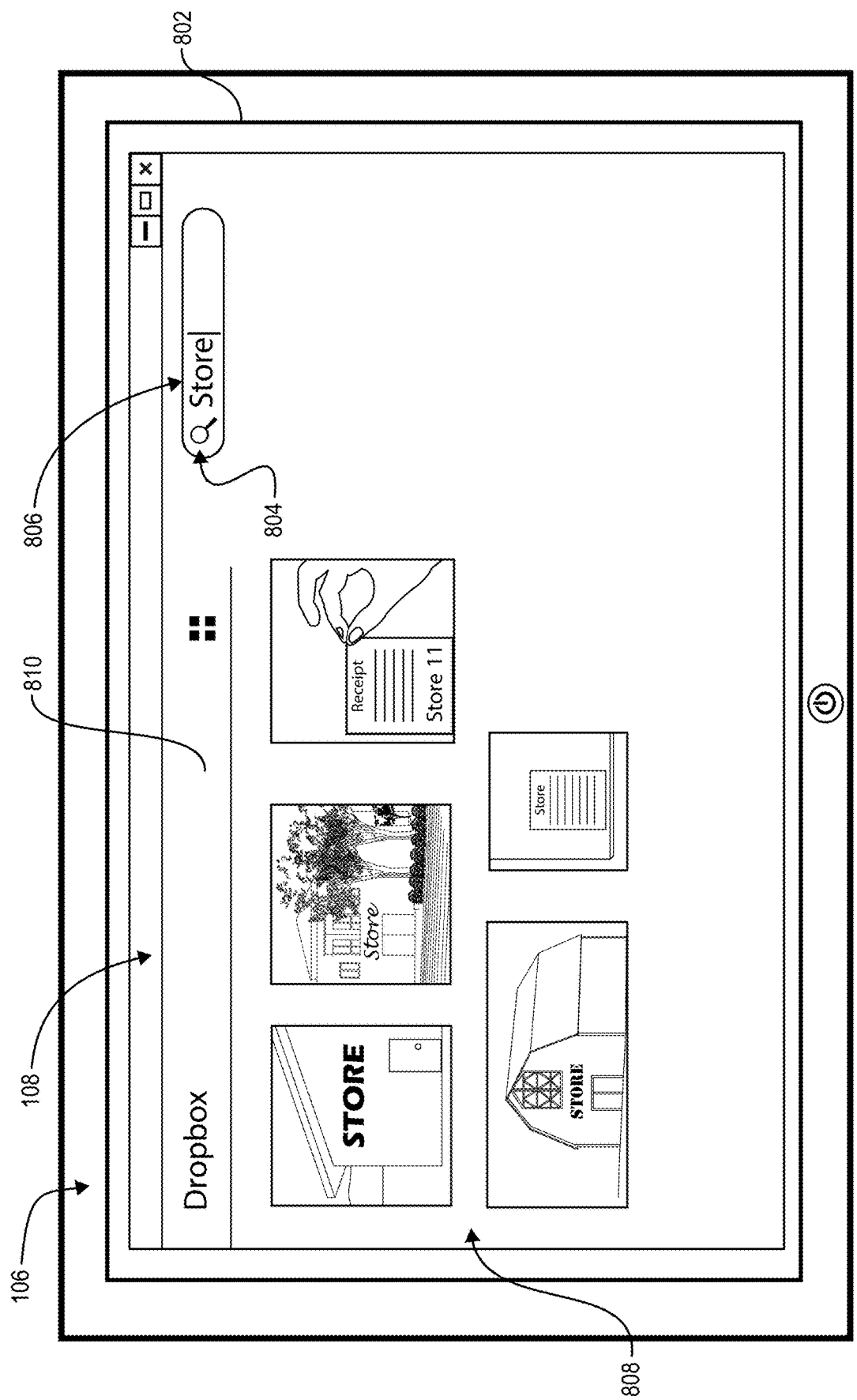
FIG. 8A illustrates searching digital images associated with computer searchable text in accordance with one or more embodiments.
Figure 8B:
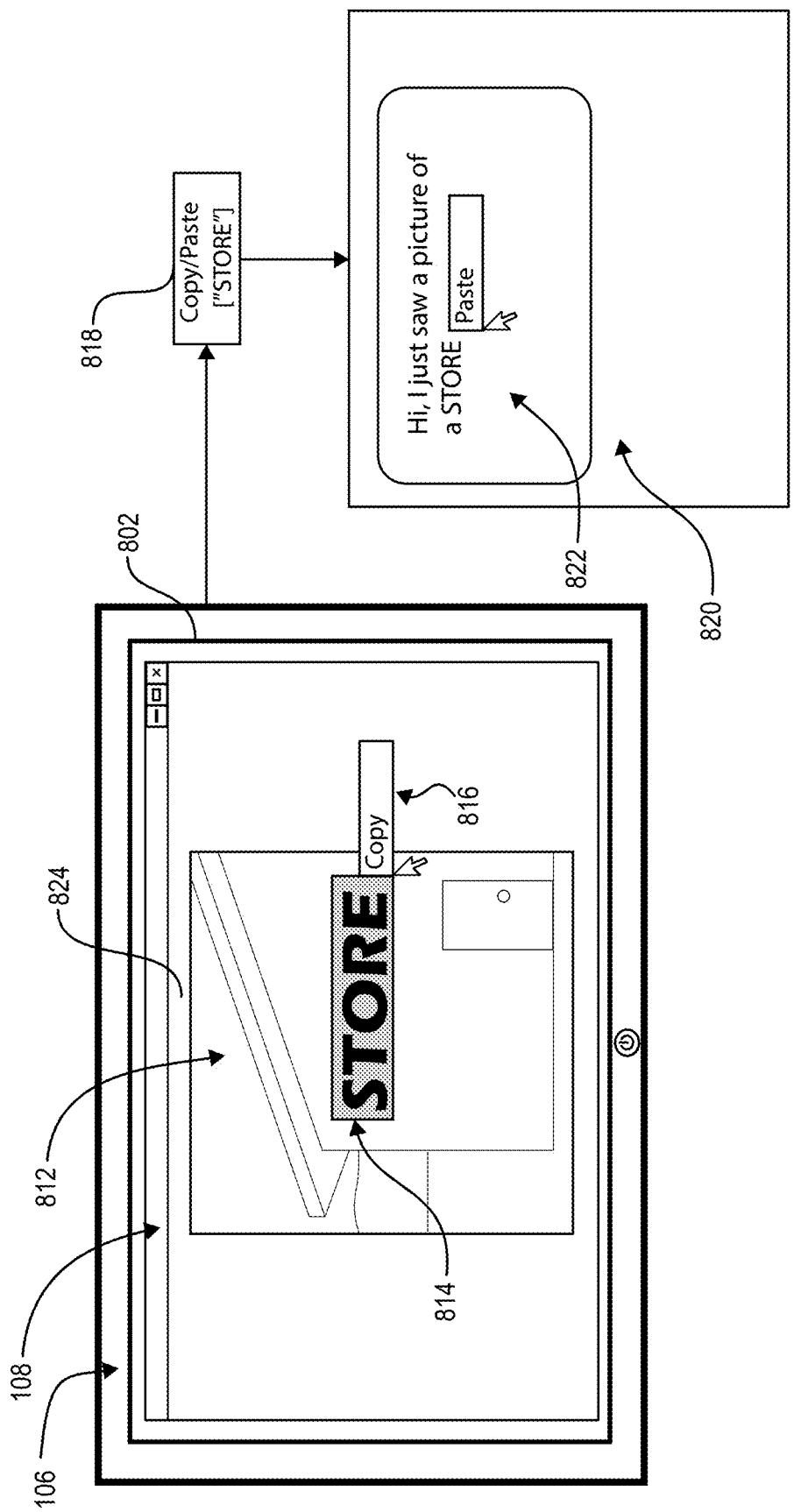
FIG. 8B illustrates copying and pasting computer searchable text from digital images in accordance with one or more embodiments.

As mentioned above, digital image character recognition system 112 can utilize generated computer searchable text from digital images in a variety of ways to improve computing systems for managing, organizing, and searching digital images. For example, as shown in FIG. 8A, digital image character recognition system 112 can utilize generated computer searchable text from digital images to search text portrayed within the digital image. Furthermore, as shown in FIG. 8B, digital image character recognition system 112 can utilize generated computer searchable text from digital images that display documents to provide copy and paste functionality for text portrayed within the digital image.

In particular, FIG. 8A, illustrates client device 106 with display 802 showing user interface 810 associated with the online content management system application 108. As shown, user interface 810 includes search bar 804 and search results 808 determined based on computer searchable text generated from documents portrayed in digital images. Specifically, in response to search query 806 entered in search bar 804, digital image character recognition system 112 searches computer generated searchable text identified from documents portrayed in digital images and identifies those digital images with searchable text corresponding to search query 806.

As mentioned above, digital image character recognition system 112 can associate generated computer searchable text for a digital image to the digital image. For instance, in some embodiments, digital image character recognition system 112 can index digital images within online content management system 104 by generating a token comprising the computer searchable text and associating the tokens to digital images that contain the search text represented in the token.

More specifically, digital image character recognition system 112, in some embodiments, can create tokens for all of the words in the computer searchable text of a digital image and store the tokens in an index. Furthermore, in one or more embodiments, digital image character recognition system 112 can link the digital image (and any other digital image containing those tokens) to the stored token in the index. For instance, in some embodiments, digital image character recognition system 112 can utilize a bag of words model to create a list of computer searchable text for a digital image. Furthermore, in some embodiments, digital image character recognition system 112 can associate tokens with keywords (e.g., other words that are determined to be associated with the token word).

Moreover, in one or more embodiments, digital image character recognition system 112 can associate the generated computer searchable text to a digital image by including the computer searchable text of the digital image in the meta-data of the digital image. Digital image character recognition system 112 can then search the meta-data of digital images.

As shown in FIG. 8A, in one or more embodiments, digital image character recognition system 112 utilizes search query 806 provided in search bar 804 to search for digital images that have computer searchable text and/or are tokenized as described above. In one or more embodiments, digital image character recognition system 112 displays digital images, that are associated with search query 806 in search bar 804, as a collection of files in search results 808. For example, as shown in FIG. 8A, a user enters search query 806 for "Store" in search bar 804. Moreover, digital image character recognition system 112 identifies digital images that are associated with the query "store" based on the generated computer searchable text and displays the identified digital images in search result 808. For example, as shown in FIG. 8A, digital image character recognition system 112 lists digital images that have generated computer searchable text for "store" in search results 808. In one or more embodiments, digital image character recognition system 112 can utilize any combination of search queries and any combination of search results. Furthermore, in some embodiments, digital image character recognition system 112 can refine search results based on other search criteria (e.g., filters).

As mentioned, digital image character recognition system 112 can also generate a digital overlay for a digital image, allowing users to copy and paste text from the digital overlay. For example, FIG. 8B illustrates client device 106 with user interface 824 (corresponding to online content management system application 108) displaying digital image 812. Digital image character recognition system 112 generates computer searchable text (e.g., "STORE") based on a document portrayed in digital image 812. Digital image character recognition system 112 then maps/overlays the computer searchable text onto digital image 812. Furthermore, digital image character recognition system 112 can create digital image formats (e.g., overlays) that are capable of mapping computer searchable text onto a digital image. Additionally, digital image character recognition system 112 can utilize the computer searchable text in a digital image to provide text copy and paste functionality.

For example, as shown in FIG. 8B, after digital image character recognition system 112 maps/overlays computer searchable text onto digital image 812. Based on user interaction with the user interface 824, a user can highlight text 814 ("STORE") in digital image 812. Furthermore, online content management system application 108 can provide copy option 816 upon detecting a highlighting action. In one or more embodiments, digital image character recognition system 112 stores computer searchable text associated with text 814 ("store") in copy/paste memory 818 when text 814 is highlighted and a user selects copy option 816.

Additionally, as shown in FIG. 8B, digital image character recognition system 112 can provide copy/paste memory 818 containing computer searchable text associated with text 814 ("STORE") from digital image 812 to other applications (e.g., messaging apps, text editors, document suites, and so forth). For example, as shown in FIG. 8B, a user can utilize text editor 820 and select paste option 822 to paste generated computer searchable text associated with text 814 ("STORE") from digital image 812 contained in copy/paste memory 818 to text editor 820. In one or more alternate embodiments, digital image character recognition system 112 can highlight multiple text elements in a digital image and can also copy and paste multiple words from a digital image to other applications.

Digital image character recognition system 112 can map/overlay computer searchable text to corresponding regions of a digital image. For example, in FIG. 8B, digital image character recognition system 112 generates an overlay and provides searchable text within digital image 812 in a region where "STORE" is reflected in the digital image. Digital image character recognition system 112 can generate the overlay in a particular region based on the location of word boxes utilized to generate computer searchable text. For instance, digital image character recognition system 112 can determine that word box for "STORE" originated from a first region of the digital image 812. Digital image character recognition system 112 can generate computer searchable text and then generate an overlay corresponding to the first region.

As mentioned above, digital image character recognition system 112 can categorize digital images based on the depicted documents in the digital image and also provide the digital images to a user associated with a category. For example, as shown in FIG. 9, digital image character recognition system 112 utilizes computer searchable text associated with digital images 904a-d in repository of digital images 902 and user data table 908 to categorize digital images based on displayed documents in the digital image and also to distribute digital images to users 910a, b associated with certain categories.

Figure 9:
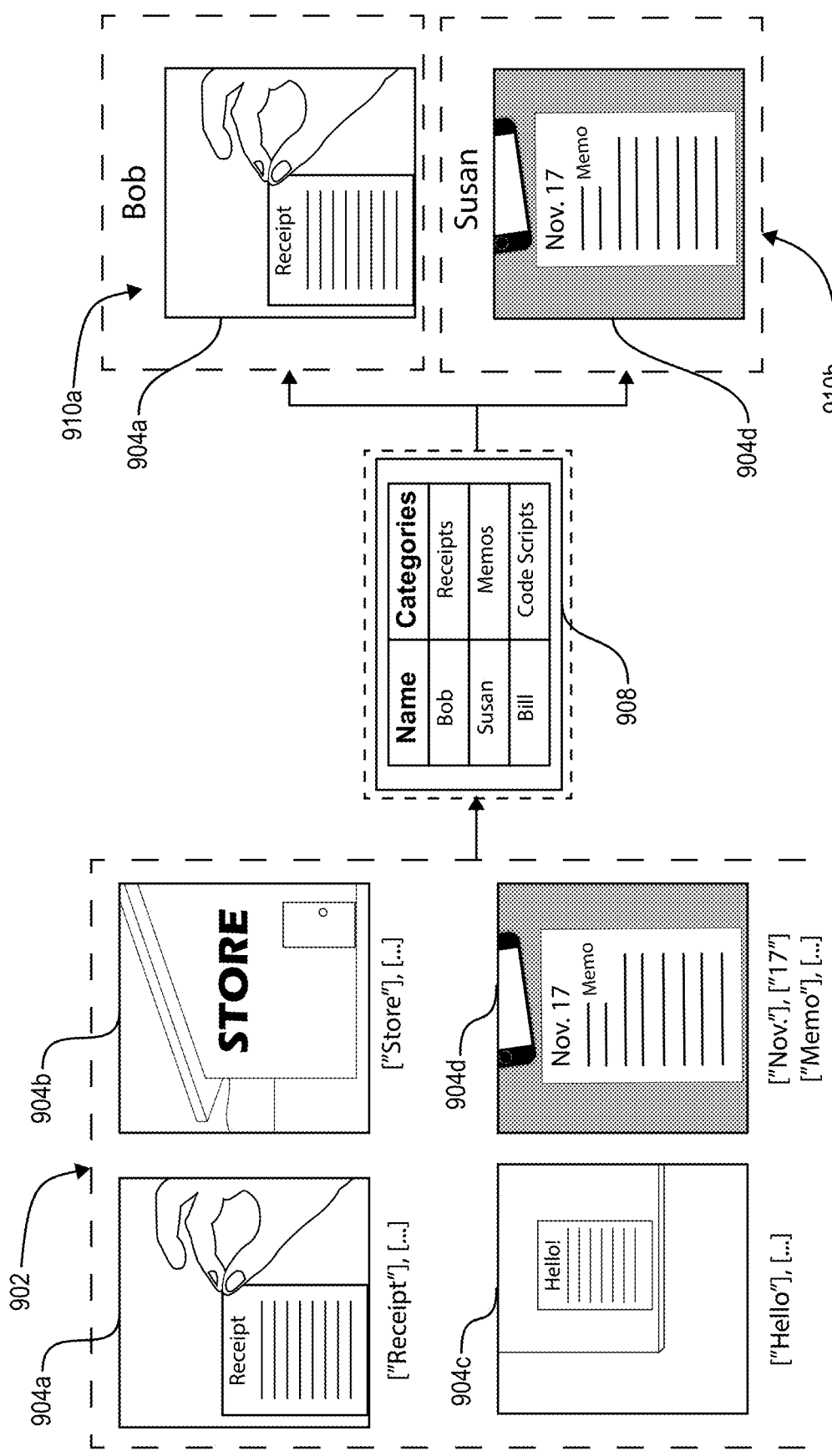
FIG. 9 illustrates categorizing digital images associated with computer searchable text in accordance with one or more embodiments.

More specifically, as shown in FIG. 9, digital image character recognition system 112 accesses repository of digital images 902 comprising digital images 904a-d. As shown, digital image character recognition system 112 generates computer searchable text based on documents portrayed in digital images 904a-904d. For instance, digital image character recognition system 112 associates digital image 904a with associated computer searchable text "receipt", digital image 904b with associated computer searchable text "store", digital image 904c with associated computer searchable text "hello", and digital image 904d with associated computer searchable text "memo". In other embodiments, digital images 904a-d can include multiple words as computer searchable text. Digital image character recognition system 112 can categorize digital images 904a-d based on computer searchable text or distribute digital images 904a-d based on computer searchable text.

For instance, as shown in FIG. 9, digital image character recognition system 112 provides digital images to a user associated with a document category from repository of digital images 902. More specifically, digital image character recognition system 112 can generate and utilize user data table 908, which includes users and document categories associated with users to provide a digital image to a user associated with a document category. For instance, as shown in FIG. 9, digital image character recognition system 112 can determine that user Bob is associated with a document category of "Receipts" from user data table 908. Thus, as illustrated in FIG. 9, digital image character recognition system 112 provides digital image 904a, which contains computer searchable text for "Receipt", to digital image repository associated to user Bob 910a. Additionally, digital image character recognition system 112 can determine that user Susan is associated with a document category of "Memos" from user data table 908. Thus, digital image character recognition system 112 provides digital image 904d, which contains computer searchable text for "Memo", to digital image repository associated to user Susan 910b.

Accordingly, digital image character recognition system 112 can categorize digital images 904a-d into document categories on online content management system 104 based on computer searchable text associated with digital images 904a-d. Furthermore, digital image character recognition system 112 can categorize digital images 904a-d into other objects with or without user associations (e.g., category folders associated with document categories on an online content management system). Additionally, digital image character recognition system 112 can provide a digital image to a user associated with a document category via email, text, and other forms of electronic communication.

In addition, digital image character recognition system 112 can generate user data table 908 based on a variety of factors. For example, in one or more embodiments, digital image character recognition system 112 generates user data table 908 (e.g., correspondence between a user and document category) based on user input (e.g., user request to receive a particular category). In other embodiments, digital image character recognition system 112 generates a correspondence between a user and document category based on position (e.g., company office manager receives receipts), based on access history (e.g., individual that repeatedly accesses memos receives memos), or based on demographic information.

Figure 10:
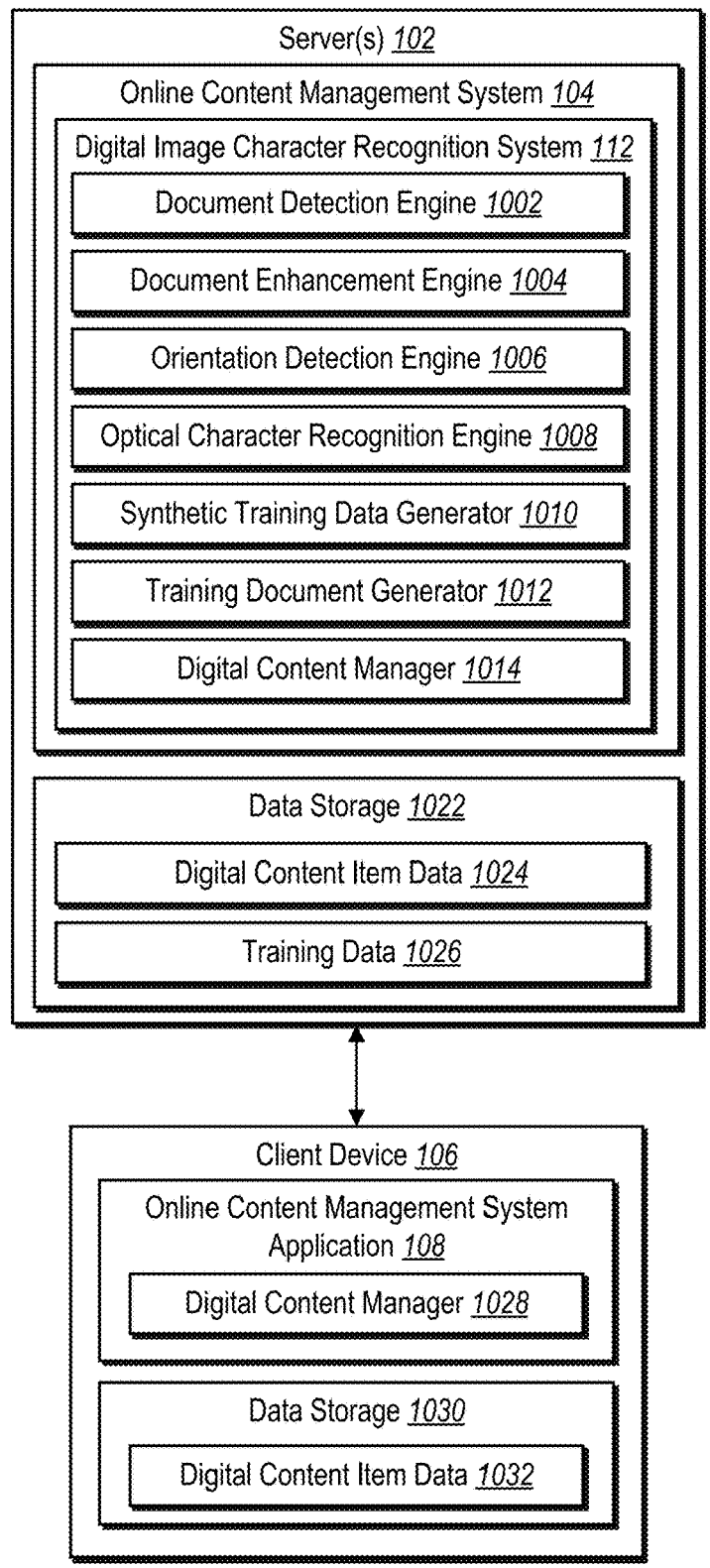
FIG. 10 illustrates an example schematic diagram of a digital image character recognition system in accordance with one or more embodiments.

Turning now to FIG. 10, additional detail will be provided regarding various components and capabilities of digital image character recognition system 112. In particular, FIG. 10 illustrates digital image character recognition system 112 implemented by server(s) 102. Additionally, digital image character recognition system 112 is also part of online content management system 104. As shown, digital image character recognition system 112 can include, but is not limited to, document detection engine 1002, document enhancement engine 1004, orientation detection engine 1006, optical character recognition engine 1008, synthetic training data generator 1010, training document generator 1012, and digital content manager 1014.

As just mentioned, and as illustrated in FIG. 10, digital image character recognition system 112 includes document detection engine 1002. More specifically, document detection engine 1002 detects, identifies, determines, and/or accesses digital content (e.g., digital images) that depict documents. For example, document detection engine 1002 utilizes document detection neural network 206 neural network to detect digital images that depict documents as discussed with reference to FIG. 2A. In one or more embodiments, document detection engine 1002 also labels the detected digital images or provides the digital images to a repository of digital images that depict documents.

As shown in FIG. 10, digital image character recognition system 112 also includes document enhancement engine 1004. In particular, document enhancement engine 1004 modifies, transforms, and/or enhances digital images that depict documents. For example, document enhancement engine 1004 utilizes computer vision techniques to determine the boundaries and corners of a displayed document and then modifies the digital image based on the displayed document. For example, document enhancement engine 1004 can identify a depicted document and crop, rectify, and enhance the depicted document in the digital image as discussed with reference to FIG. 2B.

Moreover, as shown in FIG. 10, digital image character recognition system 112 includes orientation detection engine 1006. More specifically, orientation detection engine 1006 detects, identifies, and/or identifies the orientation of a displayed document in a digital image. For example, orientation detection engine 1006 utilizes orientation neural network 222 to classify the orientation of a displayed document within a digital image as discussed with reference to FIG. 2C. In one or more embodiments, orientation detection engine 1006 also trains orientation neural network 222 with training documents generated by training document generator 1012.

Additionally, as illustrated in FIG. 10, digital image character recognition system 112 includes optical character recognition engine 1008. In particular, optical character recognition engine 1008 generates, creates, determines, and/or identifies computer searchable text for a digital image that depicts a document. For example, optical character recognition engine 1008 utilizes word detector 226 and text prediction neural network 230 as discussed with reference to FIG. 2D. More specifically, optical character recognition engine 1008 utilizes word detector 226 to detect and crop word boxes from a displayed document in a digital image to generate word boxes. Furthermore, optical character recognition engine 1008 utilizes text prediction neural network 230 to predict the text in word boxes and to generate computer searchable text from the text displayed in the word boxes. Furthermore, optical character recognition engine 1008, in some embodiments, associates the generated computer searchable text with the digital image that depicts the document. Additionally, in some embodiments, optical character recognition engine 1008 also trains text prediction neural network with synthetic training data generated by synthetic training data generator 1010.

Moreover, as shown in FIG. 10, digital image character recognition system 112 includes synthetic training data generator 1010. More specifically, synthetic training data generator 1010 generates, creates, and/or forms synthetic training data such as digital images of words. For example, synthetic training data generator 1010 utilizes corpus of words 702, set of fonts 704, and set of distortions 706 to generate synthetic training digital images 712 as discussed with reference to FIG. 7. In one or more embodiments, synthetic training data generator 1010 also generates negative synthetic training data (e.g., digital images with textures and without words) as discussed with reference to FIGS. 6 and 7.

Furthermore, as shown in FIG. 10, digital image character recognition system 112 includes training document generator 1012. In particular, training document generator 1012 generates training documents from a document by generating multiple rotations of the document. For example, training document generator 1012 utilizes initial documents at a known orientation to generate one or more ground truth orientations as discussed with reference to FIG. 4.

Further, as shown in FIG. 10, digital image character recognition system 112 includes digital content manager 1014. More specifically, digital content manager 1014 manages digital content such as digital images in online content management system 104. For example, digital content manager 1014 associates generated computer searchable text to digital images that depict documents and provides implementations to make digital images searchable based on computer searchable text associated with the digital images as discussed with reference to FIG. 8A. Also, digital content manager 1014 also provides additional functionalities to digital images associated with computer searchable text such as copy and paste functionalities as discussed with reference to FIG. 8B. Furthermore, digital content manager 1014 also categorizes digital images associated with computer searchable text based on the computer searchable text and provides users the categorized digital images as discussed with reference to FIG. 9.

Additionally, as shown in FIG. 10, server(s) 102 include data storage 1022. In particular, data storage 1022 includes digital content item data 1024 and training data 1026. Digital content item data 1024 includes all data stored, managed, edited, shared with, or created by users of online content management system 104. More specifically, digital content item data 1024 can include items such as, but not limited to, user documents, digital image files, and user folders. Moreover, training data 1026 can store models utilized by digital image character recognition system 112. For example, training data 1026 can store machine learning models and other models utilized by document detection engine 1002, document enhancement engine 1004, orientation detection engine 1006, optical character recognition engine 1008, synthetic training data generator 1010, training document generator 1012, and digital content manager 1014. Furthermore, training data 1026 can also store synthetic training data generated by synthetic training data generator 1010 and training documents generated by training document generator 1012.

Furthermore, FIG. 10 also illustrates online content management system application 108 implemented by client device 106. As shown in FIG. 10, online content management system application 108 can include, but is not limited to, digital content manager 1028. In particular, digital content manager 1028 can manage and access digital content such as digital images on server(s) 102 and client device 106. For example, digital content manager 1028 can search for and organize digital images that are searchable based on computer searchable text as discussed with reference to FIG. 8A. Furthermore, digital content manager 1028 can also utilize functionalities of digital images associated with computer searchable text such as copy and paste functionalities as discussed with reference to FIG. 8B. Moreover, digital content manager 1028 can also access or receive digital images associated with computer searchable text based on categories as discussed with reference to FIG. 9.

Additionally, as shown in FIG. 10, client device 106 includes data storage 1030. In particular, data storage 1030 includes digital content item data 1032. Digital content item data 1032 includes all data stored, managed, edited, shared with, or created by users of online content management system application 108. More specifically, digital content item data 1032 can include items such as, but not limited to, user documents, digital image files, and user folders. In one or more embodiments, digital content item data 1032 can be provided to online content management system 104.

The components 1002-1032 and their corresponding elements can comprise software, hardware, or both. For example, the components 1002-1032 and their corresponding elements can comprise one or more instructions stored on a computer-readable storage medium and executable by processors of one or more computing devices. The components 1002-1032 and their corresponding elements can comprise hardware, such as a special purpose processing device to perform a certain function or group of functions. Additionally, or alternatively, the components 1002-1032 and their corresponding elements can comprise a combination of computer-executable instructions and hardware.

Furthermore, the components 1002-1032 of digital image character recognition system 112 may, for example, be implemented as one or more stand-alone applications, as one or more modules of an application, as one or more plug-ins, as one or more library functions or functions that may be called by other applications, and/or as a cloud-computing model. Thus, the components 1002-1032 of digital image character recognition system 112 may be implemented as a stand-alone application, such as a desktop or mobile application. Furthermore, the components 1002-1032 of digital image character recognition system 112 may be implemented as one or more web-based applications hosted on a remote server. Alternatively, or additionally, the components of digital image character recognition system 112 may be implemented in a suit of mobile device applications or "apps."

Figure 11:
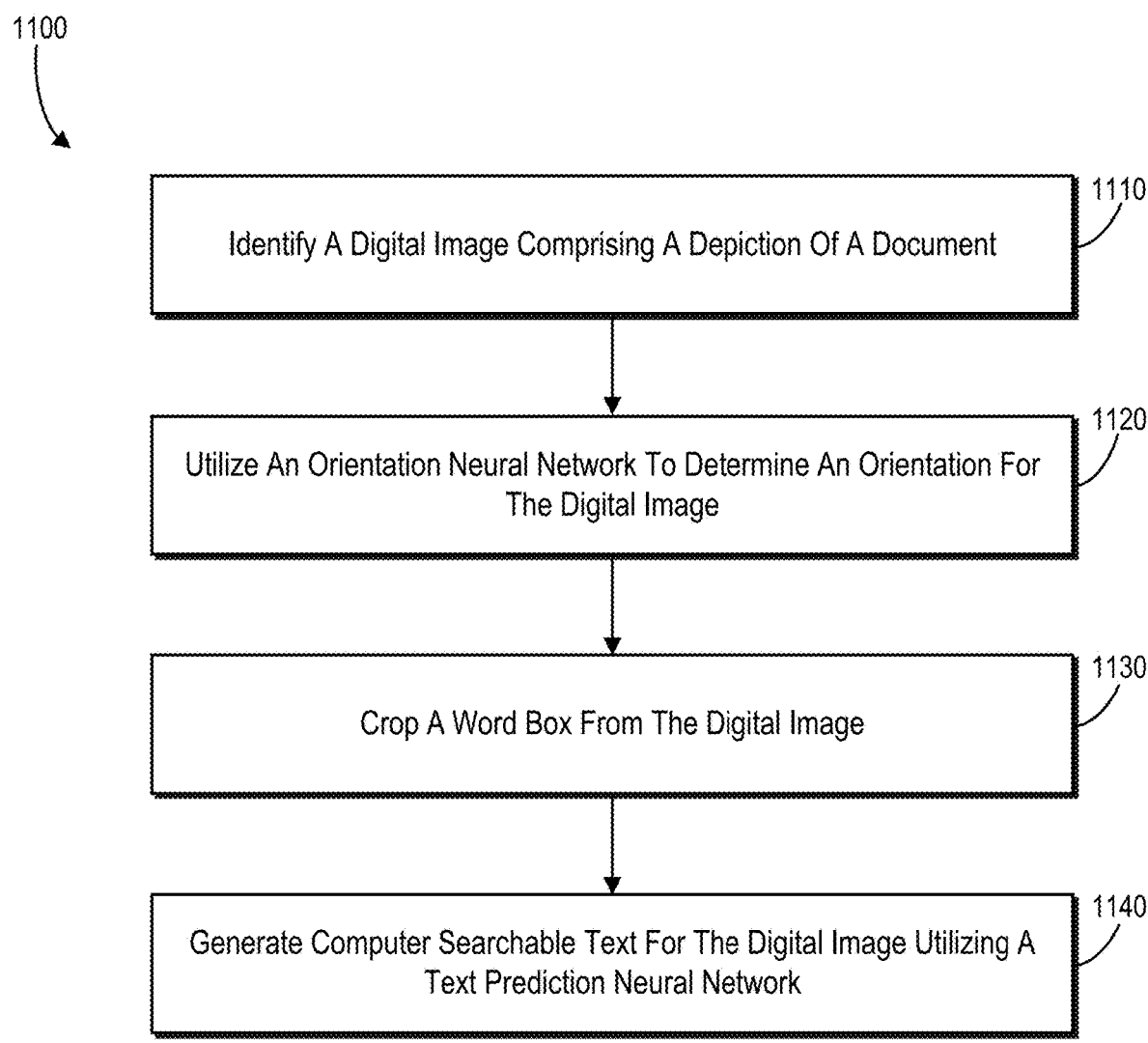
FIG. 11 illustrates a flowchart of a series of acts of generating computer searchable text for a digital image depicting a document in accordance with one or more embodiments.

Turning now to FIG. 11, this figure illustrates a series of acts 1100 to generate computer searchable text from a digital image that depicts a document. While FIG. 11 illustrates acts according to one embodiment, alternative embodiments may omit, add to, reorder, and/or modify any of the acts shown in FIG. 11. The acts of FIG. 11 can be performed as part of a method. In one or more embodiments, a non-transitory computer readable storage medium can comprise instructions that, when executed by one or more processors, cause a computing device to perform acts of FIG. 11. In still further embodiments, a system can perform the acts of FIG. 11.

The series of acts 1100 includes an act 1110 of identifying a digital image comprising a depiction of a document. One or more embodiments involve identifying the digital image comprising the depiction of the document utilizing a neural network. Additionally, one or more embodiments involve identifying a digital image comprising a depiction of a document from a repository of digital images. For example, the digital image character recognition system can analyze each digital image in a repository of digital images utilizing a document detection neural network trained to identify digital images portraying documents comprising text.

The series of acts 1100 also includes an act 1120 of utilizing an orientation neural network to determine an orientation for the digital image. For example, act 1120 involves utilizing an orientation neural network to detect an orientation of the document within the digital image. One or more embodiments involve training the orientation neural network. For example, one or more embodiments involve analyzing a training document utilizing the orientation neural network to predict an orientation of the training document and comparing the predicted orientation of the training document with a ground truth orientation of the training document. Additionally, one or more embodiments involve generating the training document. For example, one or more embodiments involve identifying an initial document at a known orientation and rotating the initial document to generate the training document and the ground truth orientation of the training document.

The series of acts 1100 further includes act 1130 of cropping a word box from the digital image. For example, act 1130 involves cropping a word box, that comprises a portion of the depiction of the document, from the digital image.

The series of acts 1100 also includes act 1140 of generating computer searchable text for the digital image utilizing a text prediction neural network. For example, act 1140 involves utilizing a text prediction neural network trained with synthetic training data to generate computer searchable text for the portion of the depiction of the document based on the word box and the detected orientation of the document. Additionally, one or more embodiments involve training the text prediction neural network with synthetic data that comprises a synthetic training digital image comprising a ground truth text label corresponding to the synthetic training digital image. For example, one or more embodiments involve training the text prediction neural network with the synthetic data by receiving the synthetic training data (e.g., the synthetic training digital image), utilizing the text prediction neural network on the synthetic training digital image to predict text depicted on the synthetic training digital image, and comparing the predicted text depicted on the synthetic training digital image with the ground truth text label corresponding to the synthetic training digital image.

Furthermore, in one or more embodiments, act 1140 also involves generating a synthetic training digital image. For example, one or more embodiments involve generating the synthetic training digital image by identifying a corpus of words and a set of fonts (and/or a set of distortions). Additionally, one or more embodiments involve generating the synthetic training digital image by selecting a word from the corpus of words and a font from the set of fonts (and/or a distortion from the set of distortions) and applying the font (and/or the distortion) to the word to generate a modified word. One or more embodiments involve generating the synthetic training digital image such that the synthetic training digital image portrays the modified word. Additionally, in one or more embodiments, the set of distortions comprise at least two of rotations, underlines, blurs, noises, shadows, creases, textures, or applying lens filters. One or more embodiments involve generating a synthetic training digital image in an additional language. For example, in one or more embodiments the corpus of words and the synthetic training digital image corresponds to a first language. Additionally, one or more embodiments involve generating an additional synthetic training digital image corresponding to an additional language by utilizing an additional corpus of words corresponding to the additional language.

In one or more embodiments, the digital image character recognition system further indexes the digital image by associating a token with the digital image. Additionally, in one or more embodiments, the token comprises the computer searchable text. In one or more embodiments, the digital image character recognition system further utilizes the computer searchable text to identify a document category corresponding to the digital image comprising the depiction of the document and provides the digital image to a user associated with the document category.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
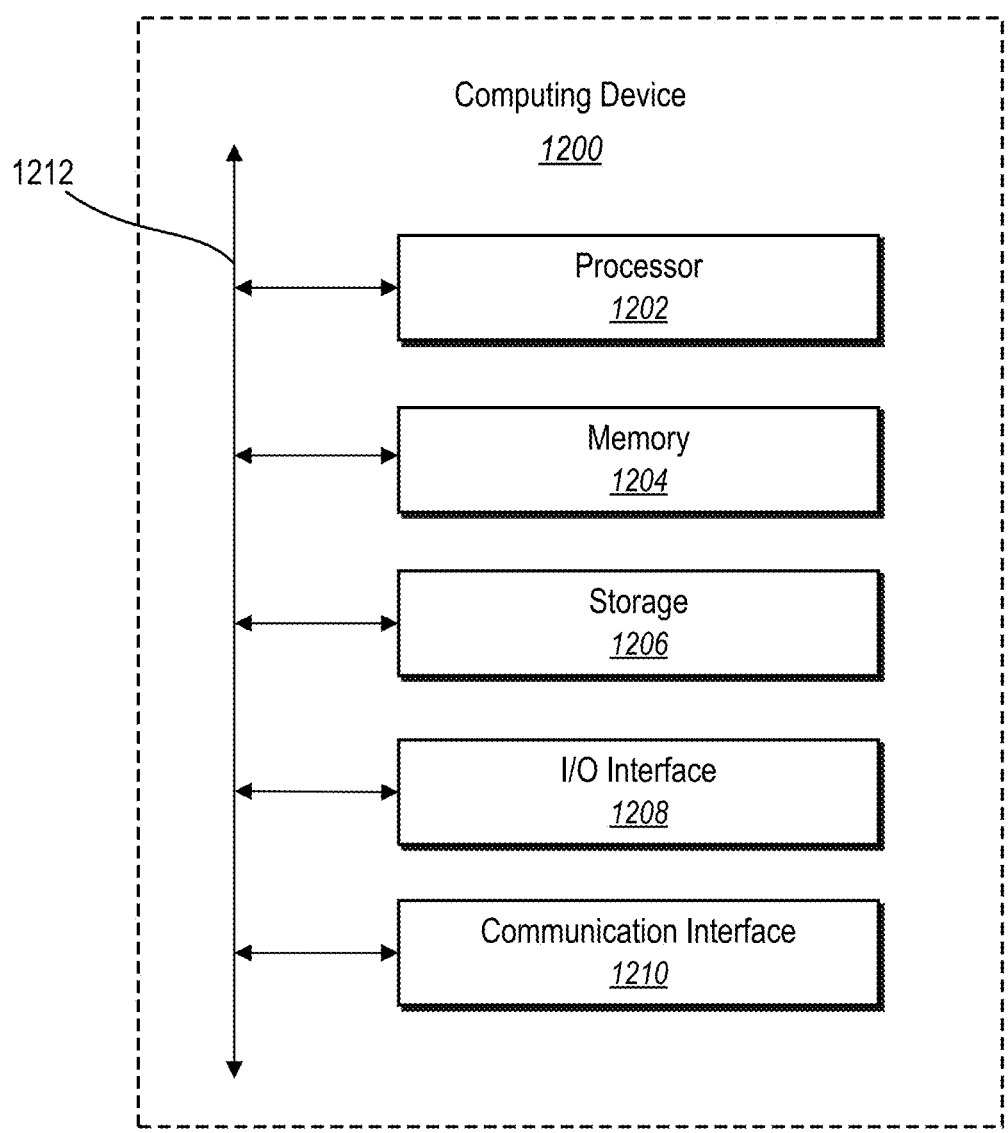
FIG. 12 illustrates a block diagram of an exemplary computing device in accordance with one or more embodiments.

FIG. 12 illustrates a block diagram of exemplary computing device 1200 that may be configured to perform one or more of the processes described above. One will appreciate that server(s) 102 and/or client device 106 may comprise one or more computing devices such as computing device 1200. As shown by FIG. 12, computing device 1200 can comprise processor 1202, memory 1204, storage device 1206, I/O interface 1208, and communication interface 1210, which may be communicatively coupled by way of communication infrastructure 1212. While an exemplary computing device 1200 is shown in FIG. 12, the components illustrated in FIG. 12 are not intended to be limiting. Additional or alternative components may be used in other embodiments. Furthermore, in certain embodiments, computing device 1200 can include fewer components than those shown in FIG. 12. Components of computing device 1200 shown in FIG. 12 will now be described in additional detail.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage device 1206 and decode and execute them. In particular embodiments, processor 1202 may include one or more internal caches for data, instructions, or addresses. As an example and not by way of limitation, processor 1202 may include one or more instruction caches, one or more data caches, and one or more translation lookaside buffers (TLBs). Instructions in the instruction caches may be copies of instructions in memory 1204 or storage device 1206.

Memory 1204 may be used for storing data, metadata, and programs for execution by the processor(s). Memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1204 may be internal or distributed memory.

Storage device 1206 includes storage for storing data or instructions. As an example and not by way of limitation, storage device 1206 can comprise a non-transitory storage medium described above. Storage device 1206 may include a hard disk drive (HDD), a floppy disk drive, flash memory, an optical disc, a magneto-optical disc, magnetic tape, or a Universal Serial Bus (USB) drive or a combination of two or more of these. Storage device 1206 may include removable or non-removable (or fixed) media, where appropriate. Storage device 1206 may be internal or external to computing device 1200. In particular embodiments, storage device 1206 is non-volatile, solid-state memory. In other embodiments, Storage device 1206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1208 allows a user to provide input to, receive output from, and otherwise transfer data to and receive data from computing device 1200. I/O interface 1208 may include a mouse, a keypad or a keyboard, a touch screen, a camera, an optical scanner, network interface, modem, other known I/O devices or a combination of such I/O interfaces. I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1208 is configured to provide graphical data to a display for presentation to a user. The graphical data may be representative of one or more graphical user interfaces and/or any other graphical content as may serve a particular implementation.

Communication interface 1210 can include hardware, software, or both. In any event, communication interface 1210 can provide one or more interfaces for communication (such as, for example, packet-based communication) between computing device 1200 and one or more other computing devices or networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 1210 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1210 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1210 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MIMS"), radio frequency ("RF") signaling technologies, Long Term Evolution ("LTE") technologies, wireless communication technologies, in-band and out-of-band signaling technologies, and other suitable communications networks and technologies.

Communication infrastructure 1212 may include hardware, software, or both that couples components of computing device 1200 to each other. As an example and not by way of limitation, communication infrastructure 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 13:
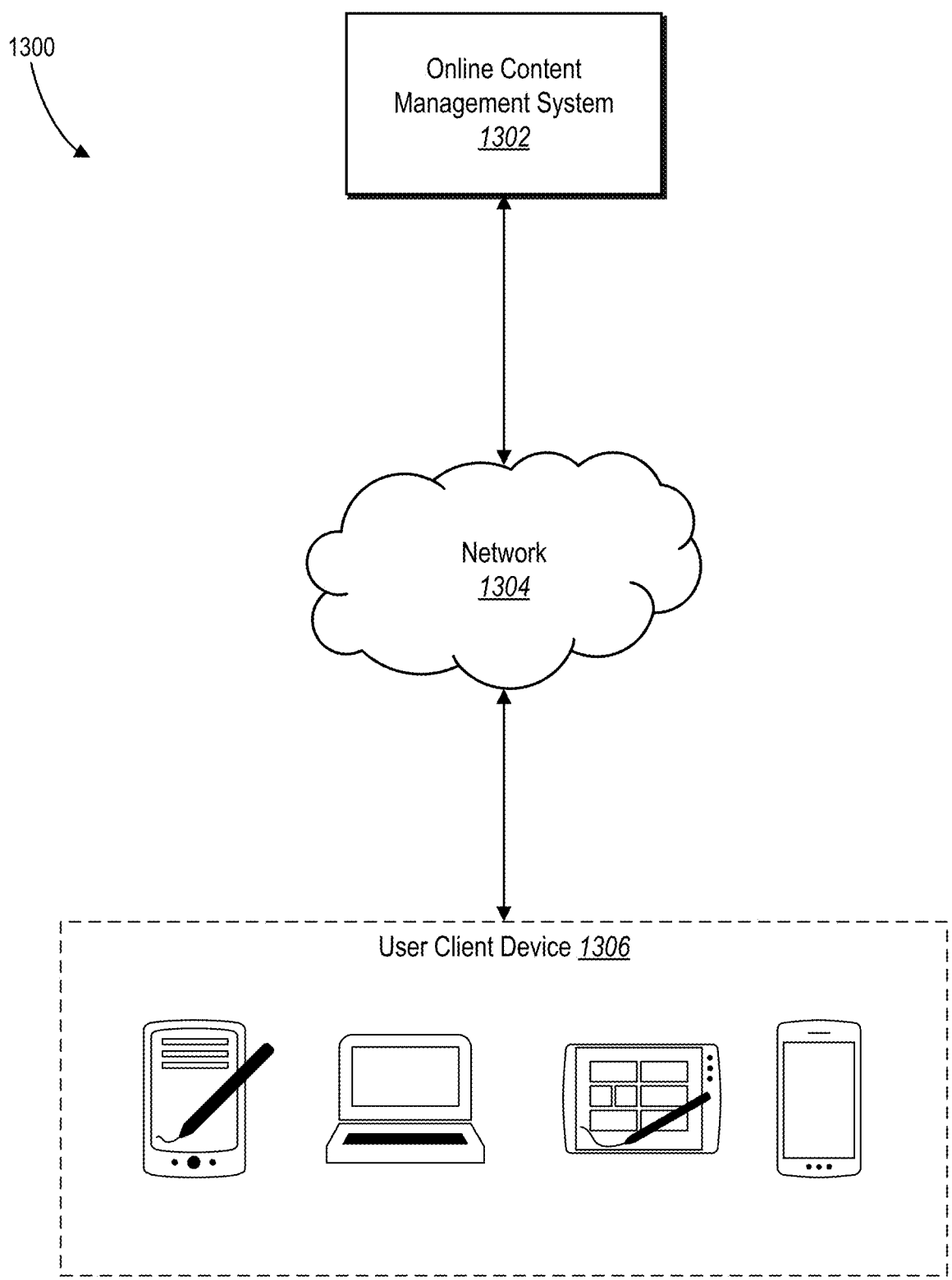
FIG. 13 illustrates an example environment of a networking system having the digital image character recognition system in accordance with one or more embodiments.

FIG. 13 is a schematic diagram illustrating environment 1300 within which one or more embodiments of online content management system 104 can be implemented. Online content management system 1302 may generate, store, manage, receive, and send digital content (such as digital videos). For example, online content management system 1302 may send and receive digital content to and from client devices 1306 by way of network 1304. In particular, online content management system 1302 can store and manage a collection of digital content. Online content management system 1302 can manage the sharing of digital content between computing devices associated with a plurality of users. For instance, online content management system 1302 can facilitate a user sharing a digital content with another user of online content management system 1302.

In particular, online content management system 1302 can manage synchronizing digital content across multiple client devices 1306 associated with one or more users. For example, a user may edit digital content using client device 1306. The online content management system 1302 can cause client device 1306 to send the edited digital content to online content management system 1302. Online content management system 1302 then synchronizes the edited digital content on one or more additional computing devices.

In addition to synchronizing digital content across multiple devices, one or more embodiments of online content management system 1302 can provide an efficient storage option for users that have large collections of digital content. For example, online content management system 1302 can store a collection of digital content on online content management system 1302, while the client device 1306 only stores reduced-sized versions of the digital content. A user can navigate and browse the reduced-sized versions (e.g., a thumbnail of a digital image) of the digital content on client device 1306. In particular, one way in which a user can experience digital content is to browse the reduced-sized versions of the digital content on client device 1306.

Another way in which a user can experience digital content is to select a reduced-size version of digital content to request the full- or high-resolution version of digital content from online content management system 1302. In particular, upon a user selecting a reduced-sized version of digital content, client device 1306 sends a request to online content management system 1302 requesting the digital content associated with the reduced-sized version of the digital content. Online content management system 1302 can respond to the request by sending the digital content to client device 1306. Client device 1306, upon receiving the digital content, can then present the digital content to the user. In this way, a user can have access to large collections of digital content while minimizing the amount of resources used on client device 1306.

Client device 1306 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1306 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1304.

Network 1304 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1306 may access online content management system 1302.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method, comprising:
   identifying a digital image comprising a depiction of a document;
   utilizing an orientation neural network to detect an orientation of the document within the digital image;
   cropping a word box from the digital image, wherein the word box comprises a portion of the depiction of the document; and
   utilizing a text prediction neural network trained with synthetic training data to generate computer searchable text for the portion of the depiction of the document based on the word box and the detected orientation of the document.

2. The method as recited in claim 1, wherein identifying the digital image comprising the depiction of the document comprises analyzing each digital image in a repository of digital images utilizing a document detection neural network trained to identify digital images portraying documents comprising text.

3. The method as recited in claim 1, further comprising training the orientation neural network by:

analyzing a training document utilizing the orientation neural network to predict an orientation of the training document; and comparing the predicted orientation of the training document with a ground truth orientation of the training document.

4. The method as recited in claim 3, further comprising generating the training document by:

identifying an initial document at a known orientation; and rotating the initial document to generate the training document and the ground truth orientation of the training document.

5. The method as recited in claim 1, further comprising training the text prediction neural network with the synthetic training data by:

receiving the synthetic training data, wherein the synthetic training data comprises a synthetic training digital image comprising a ground truth text label corresponding to the synthetic training digital image;

utilizing the text prediction neural network on the synthetic training digital image to predict text depicted by the synthetic training digital image; and comparing the predicted text depicted by the synthetic training digital image with the ground truth text label corresponding to the synthetic training digital image.

6. The method as recited in claim 5, further comprising generating the synthetic training digital image by:

identifying a corpus of words and a set of fonts;

selecting a word from the corpus of words and a font from the set of fonts;

applying the font to the word to generate a modified word; and generating the synthetic training digital image such that the synthetic training digital image portrays the modified word.

7. The method as recited in claim 6, further comprising generating the synthetic training digital image by:

identifying a set of distortions;

selecting a distortion from the set of distortions; and applying the distortion to the word to generate the modified word.

8. The method as recited in claim 6, wherein the corpus of words and the synthetic training digital image corresponds to a first language and further comprising generating an additional synthetic training digital image corresponding to an additional language by utilizing an additional corpus of words corresponding to the additional language.

9. The method as recited in claim 1, further comprising indexing the digital image by associating a token with the digital image, the token comprising the computer searchable text.

10. The method as recited in claim 1, further comprising:

utilizing the computer searchable text to identify a document category corresponding to the digital image comprising the depiction of the document; and providing the digital image to a user associated with the document category.

11. A non-transitory computer readable storage medium comprising instructions that, when executed by at least one processor, cause a computing device to:

identify a digital image comprising a depiction of a document;

utilize an orientation neural network to detect an orientation of the document within the digital image;

crop a word box from the digital image, wherein the word box comprises a portion of the depiction of the document; and utilize a text prediction neural network trained with synthetic training data to generate computer searchable text for the portion of the depiction of the document based on the word box and the detected orientation of the document.

12. The non-transitory computer readable storage medium of claim 11, wherein the instructions, when executed by the at least one processor, cause the computing device to identify the digital image comprising the depiction of the document by analyzing each digital image in a repository of digital images utilizing a document detection neural network trained to identify digital images portraying documents comprising text.

13. The non-transitory computer readable storage medium of claim 11, further comprising instructions that, when executed by the at least one processor, cause the computing device to train the orientation neural network by:

analyzing a training document utilizing the orientation neural network to predict an orientation of the training document; and comparing the predicted orientation of the training document with a ground truth orientation of the training document.

14. The non-transitory computer readable storage medium of claim 13, further comprising instructions that, when executed by the at least one processor, cause the computing device to generate the training document by:

identifying an initial document at a known orientation; and rotating the initial document to generate the training document and the ground truth orientation of the training document.

15. The non-transitory computer readable storage medium of claim 11, further comprising instructions that, when executed by the at least one processor, cause the computing device to train the text prediction neural network with the synthetic training data by:

receiving the synthetic training data, wherein the synthetic training data comprises a synthetic training digital image comprising a ground truth text label corresponding to the synthetic training digital image;

utilizing the text prediction neural network on the synthetic training digital image to predict text depicted by the synthetic training digital image; and comparing the predicted text depicted by the synthetic training digital image with the ground truth text label corresponding to the synthetic training digital image.

16. The non-transitory computer readable storage medium of claim 15, further comprising instructions that, when executed by the at least one processor, cause the computing device to generate the synthetic training digital image by:

identify a corpus of words, a set of fonts, and a set of distortions;

selecting a word from the corpus of words, a font from the set of fonts, and a distortion from the set of distortions;

applying the font and the distortion to the word to generate a modified word; and generating the synthetic training digital image such that the synthetic training digital image portrays the modified word.

17. A system comprising:

at least one processor; and a non-transitory computer readable storage medium comprising instructions that, when executed by the at least one processor, cause the system to:
identify a digital image comprising a depiction of a document;
utilize an orientation neural network to detect an orientation of the document within the digital image;
crop a word box from the digital image, wherein the word box comprises a portion of the depiction of the document; and
utilize a text prediction neural network trained with synthetic training data to generate computer searchable text for the portion of the depiction of the document based on the word box and the detected orientation of the document.

18. The system of claim 17, further comprising instructions that, when executed by the at least one processor, cause the system to train the orientation neural network by:
analyzing a training document utilizing the orientation neural network to predict an orientation of the training document; and
comparing the predicted orientation of the training document with a ground truth orientation of the training document.

19. The system of claim 17, further comprising instructions that, when executed by the at least one processor, cause the system to train the text prediction neural network with the synthetic training data by:
receiving the synthetic training data, wherein the synthetic training data comprises a synthetic training digital image comprising a ground truth text label corresponding to the synthetic training digital image;
utilizing the text prediction neural network on the synthetic training digital image to predict text depicted by the synthetic training digital image; and
comparing the predicted text depicted by the synthetic training digital image with the ground truth text label corresponding to the synthetic training digital image.

20. The system of claim 19, further comprising instructions that, when executed by the at least one processor, cause the system to generate the synthetic training digital image by:
identifying a corpus of words, a set of fonts, and a set of distortions;
selecting a word from the corpus of words, a font from the set of fonts, and a distortion from the set of distortions;
applying the font and the distortion to the word to generate a modified word; and
generating the synthetic training digital image such that the synthetic training digital image portrays the modified word.

* * * * *